United States Patent
Minami et al.

(10) Patent No.: US 6,331,966 B1
(45) Date of Patent: Dec. 18, 2001

(54) OPTICAL STORAGE APPARATUS AND RECORDING AND REPRODUCING METHOD OF OPTICAL STORAGE MEDIUM

(75) Inventors: Akira Minami; Yoshiyuki Nanba, both of Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/162,525

(22) Filed: Sep. 29, 1998

(30) Foreign Application Priority Data

Mar. 16, 1998 (JP) .................................................. 10-064990

(51) Int. Cl.$^7$ ......................................................... G11B 7/00
(52) U.S. Cl. ...................... 369/13; 369/53.26; 369/53.37
(58) Field of Search ................... 369/13, 59, 116, 369/54, 53.26, 53.27, 53.37, 53.31, 47.5, 47.52; 360/59

(56) References Cited

U.S. PATENT DOCUMENTS

| | | | |
|---|---|---|---|
| 5,329,512 | * | 7/1994 | Fukimoto et al. ...................... 369/13 |
| 5,335,213 | * | 8/1994 | Fukumoto et al. ..................... 369/13 |
| 5,367,509 | * | 11/1994 | Fukumoto et al. .................... 369/13 |
| 5,596,555 | * | 1/1997 | Osato et al. ........................... 369/13 |
| 5,637,394 | * | 6/1997 | Nakajima et al. ..................... 369/13 |
| 5,796,704 | | 8/1998 | Nanba et al. . |
| 5,959,942 | * | 9/1999 | Taguchi et al. ........................ 369/59 |
| 6,014,348 | * | 1/2000 | Kim ....................................... 369/59 |
| 6,128,254 | * | 10/2000 | Matsumoto et al. ................... 369/13 |

FOREIGN PATENT DOCUMENTS

| | | |
|---|---|---|
| 58179904 | 10/1983 | (JP) . |
| 61260439 | 11/1986 | (JP) . |
| 01201846 | 8/1989 | (JP) . |
| 04258831 | 9/1992 | (JP) . |
| 01191325 | 5/1994 | (JP) . |
| 06150423 | 5/1994 | (JP) . |

* cited by examiner

Primary Examiner—Thang V. Tran
(74) Attorney, Agent, or Firm—Greer, Burns & Crain, Ltd.

(57) ABSTRACT

A calibration processing unit is provided, a reproducing operation of an optical storage medium by a reproducing unit is executed while changing a reproducing magnetic field and a reproducing laser power, a reproducible state is measured, and a set of best values of the reproducing magnetic field and the reproducing laser power which are used in the reproducing unit are determined on the basis of the measurement result. The calibration processing unit increases the reproducing magnetic field in a state where the reproducing laser power is fixed. When the reproducible state is not obtained, the measurement of the reproducible state due to the increase in reproducing magnetic field is repeated while increasing the reproducing laser power step by step. The reproducible state can be also measured while alternately increasing the reproducing laser power and the reproducing magnetic field.

35 Claims, 24 Drawing Sheets

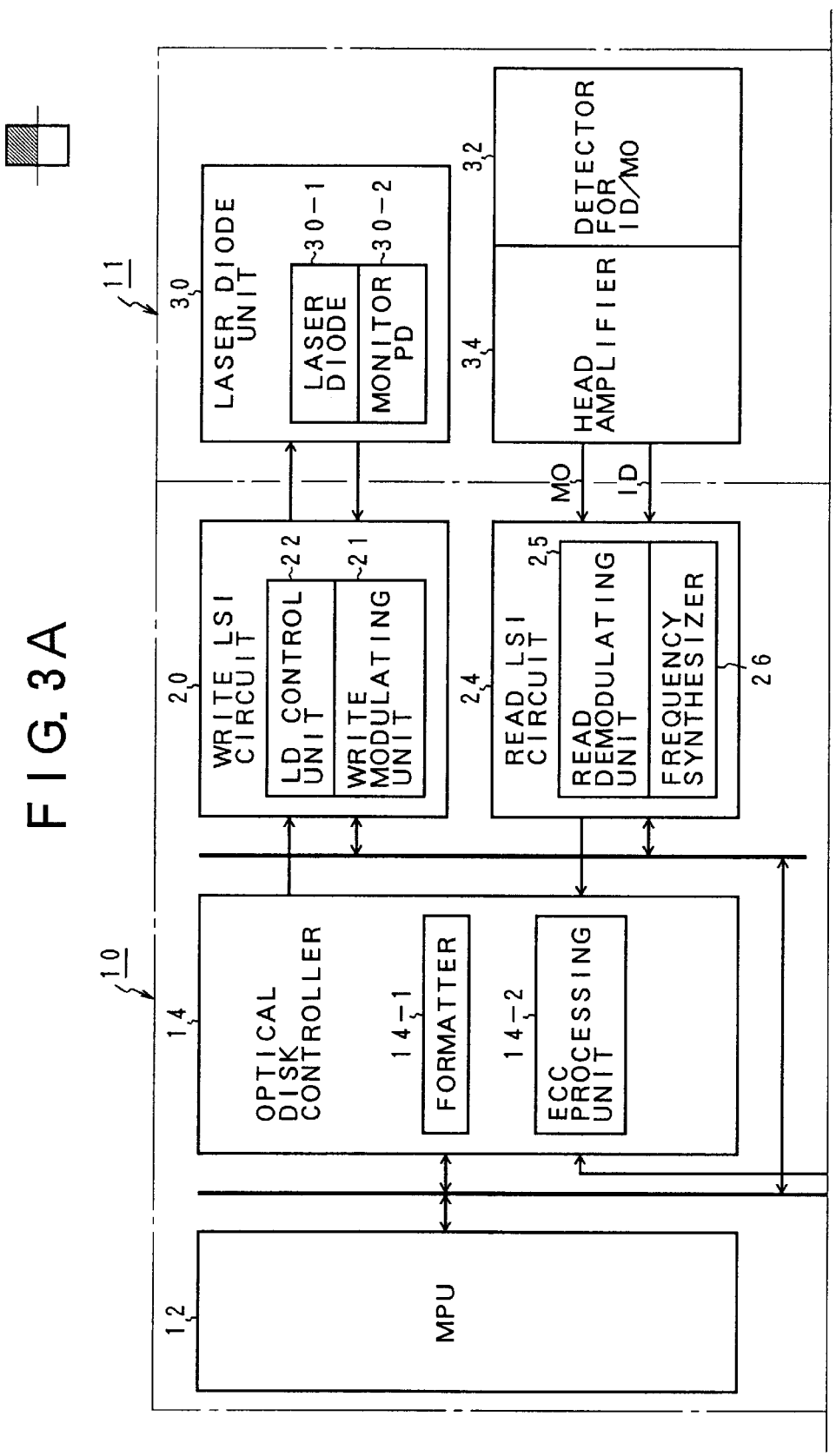

FIG. 8

| ZONE No. i | REPRODUCING MAGNETIC FIELD INSTRUCTION VALUE | REPRODUCING POWER INSTRUCTION VALUE |
|---|---|---|
| Z1 | Hr1 | Pr1 |
| Z2 | Hr2 | Pr2 |
| Z3 | Hr3 | Pr3 |
| Z4 | Hr4 | Pr4 |
| Z5 | Hr5 | Pr5 |
| ⋮ | ⋮ | ⋮ |
| Zn | Hrn | Prn |

FIG. 17B
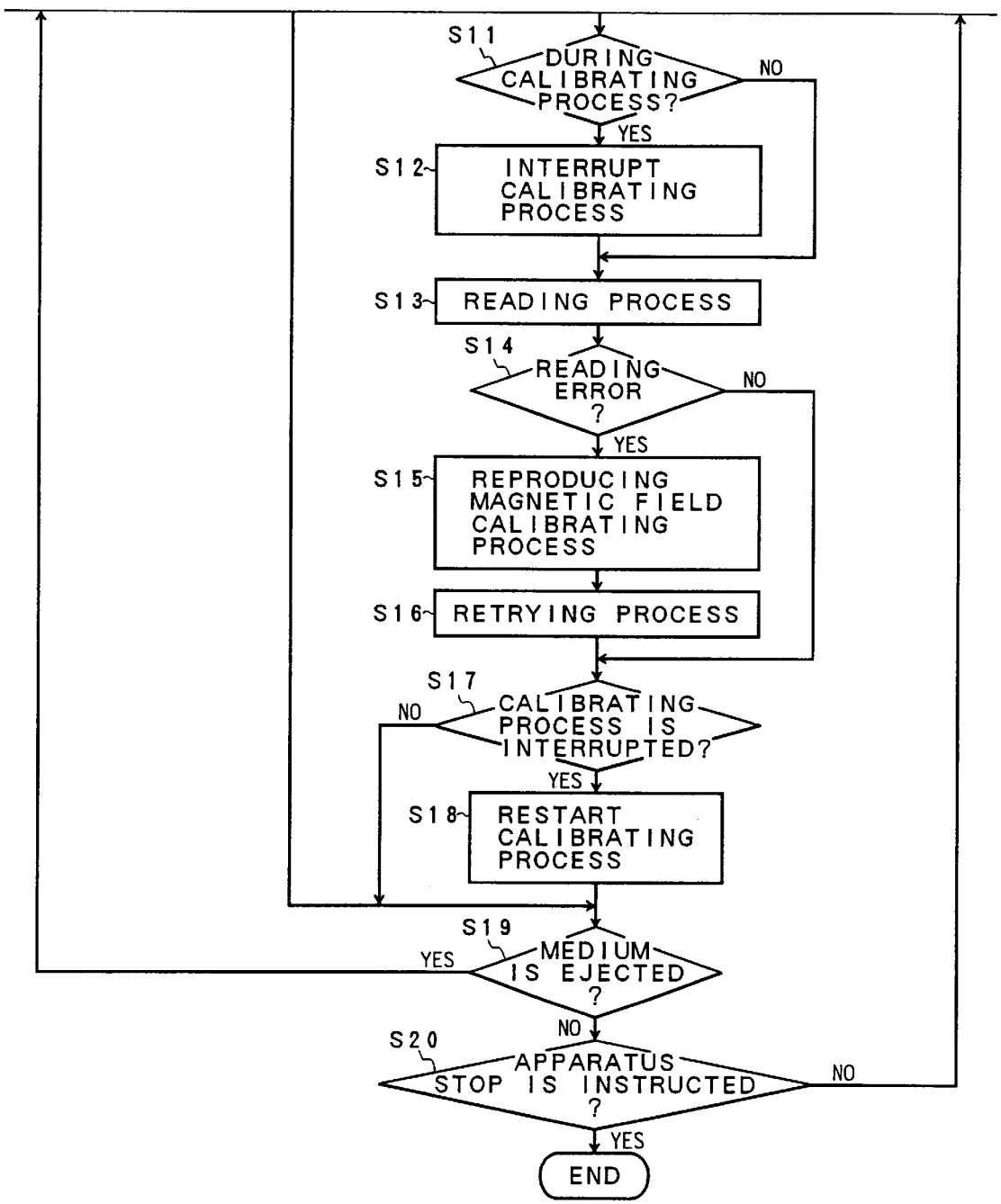

OPTICAL STORAGE APPARATUS AND RECORDING AND REPRODUCING METHOD OF OPTICAL STORAGE MEDIUM

BACKGROUND OF THE INVENTION

The present invention relates to an optical storage apparatus for recording and reproducing information by using a laser beam and a recording and reproducing method of an optical storage medium. More particularly, the invention relates to an optical storage apparatus for recording and reproducing data at a density smaller than a beam diameter known as a magnetically induced super resolution and a recording and reproducing method of an optical storage medium.

In recent years, an optical disk is spotlighted as an external storage medium of a computer. According to the optical disk, by forming magnetic recording pits on the submicron order onto a medium by using laser beam, a recording capacity can be remarkably increased as compared with that of a floppy disk or a hard disk serving as a conventional external storage medium. Further, in a magnetooptic disk as a perpendicular magnetic storage medium using a material of the rare earth—transition metal system, information is rewritable and a development in future is expected more and more.

For example, the optical disk has a storage capacity of 540 MB or 640 MB per side of 3.5 inches. This means that a storage capacity of one 3.5-inch floppy disk is equal to about 1 MB and one optical disk has a storage capacity of 540 or 640 floppy disks. As mentioned above, the optical disk is a rewritable storage medium having a very high recording density. In order to prepare for a coming multimedia age, however, it is necessary to further increase the recording density of the optical disk to a value higher than the present one. In order to increase the recording density, more pits have to be recorded on the medium. For this purpose, it is necessary to further reduce the pit size to a value smaller than the present pit size and to narrow the interval between the pits. In case of increasing the recording density by such a method, it is necessary to further shorten a wavelength of laser beam to a value shorter than the present wavelength of 670 nm. When a practical use is considered, however, the pit size has to be reduced at the present wavelength of 670 nm. In this case, with respect to the recording, a pit smaller than the beam diameter can be formed by controlling a power of the laser beam. With respect to the reproduction, however, when the pit smaller than the beam diameter is reproduced, a crosstalk with the adjacent pit increases and, in the worst case, the adjacent pit also enters the reproducing beam. It is, therefore, very difficult to form such a small pit when the practicality is considered.

As a method of reproducing the pit smaller than the beam diameter by the present wavelength of 670 nm, there is a magnetooptic recording and reproducing method represented by JP-A-3-93058. Such a method is known as a recording and reproducing method by the MSR (Magnetically induced Super Resolution). The method has two methods of an FAD (Front Aperture Detection) method and an RAD (Rear Aperture Detection) method.

According to the FAD method, as shown in FIGS. 1A and 1B, a storage medium is divided into a recording layer 220 and a reproducing layer 216 and information is reproduced by applying a reproducing magnetic field Hr to the recording medium in a state where a laser spot 222 of a read beam is irradiated thereto. In this instance, with respect to a portion of a recording pit, a magnetic coupling of a switching layer 218 formed in a boundary between the reproducing layer 216 and the recording layer 220 is released depending on a temperature distribution of the medium heating by the laser spot 222. The reproduction layer 216 is influenced by the reproducing magnetic field Hr and becomes a mask. On the contrary, with respect to a portion of the next recording pit, the magnetic coupling of the switching layer 218 is kept and the portion becomes an opening 224. Consequently, only a pit 230 of the opening 224 can be read without being influenced by a neighboring pit 226 as in case of the laser spot 222.

On the other hand, according to the RAD method, as shown in FIGS. 2A and 2B, an initialization for aligning the magnetizing direction of the reproducing layer 216 into a predetermined direction is executed by using an initializing magnet 232 and the reading operation is performed by slightly increasing a reproducing laser power at the time of reproduction. Upon reading, a mask 236 in which initial magnetization information remains and an opening 238 in which the initial magnetization information is erased and to which magnetization information of the recording layer 220 is transferred are formed in the reproducing layer 216 depending on the temperature distribution of the medium heating by a laser spot 234 of the read beam. The magnetization information of the recording layer 220 transferred to the reproducing layer 216 is converted into an optical signal by a magnetooptic effect (Kerr effect or Faraday effect), thereby reproducing data. In this instance, on the contrary to a pit 228 in the recording layer 220 which is being read at present, information is not transferred to the pit 230 in the recording layer 220 to be read out next because the mask 236 is formed by the initial magnetization information in the reproducing layer 216. Consequently, even if the recording pit is smaller than the laser spot 234, a crosstalk does not occur and a pit smaller than the beam diameter can be reproduced. Further, by using the magnetically induced super resolution, since the region of the recording layer 220 except for a reproducing portion is masked by the initialized reproducing layer 216, a pit interference from the adjacent pit does not occur and the pit interval can be further narrowed. Since a crosstalk from the neighboring track can be also suppressed, the track pitch can be also decreased and the density can be increased even if the present wavelength of 780 nm is used.

The conventional optical disk apparatus using the magnetically induced super resolution has, however, a problem such that if the intensity of the reproducing magnetic field which is used at the time of reproduction is not strictly controlled, a proper reproducing operation cannot be executed. The reason is as follows. For example, when the reproducing magnetic field Hr is too weak in the FAD method of FIGS. 1A and 1B, the forming range of the mask 226 in FIG. 1B by the magnetization of the reproducing layer 216 decreases, so that the pit 228 is not masked and a crosstalk occurs. When the reproducing magnetic field is too strong, the forming range of the mask 226 is widened, the pit 230 is also partially masked, a reproducing level decreases, and an error occurs. The reproducing magnetic field Hr simultaneously acts on the recording layer 220 as well and the recording data may be erased.

When the initializing magnetic field is too weak in the RAD method of FIGS. 2A and 2B, an erasing range by the beam heating of the initial magnetization of the reproducing layer 216 is widened and the forming range of the mask portion decreases, the pit 230 in FIG. 2B is not masked, and a crosstalk is caused. When the initializing magnetic field is too strong, the erasing range by the beam heating of the initializing magnetic field of the reproducing layer 216 is narrowed, the forming range of the mask 236 is widened, the pit 228 is also partially masked, the reproducing level decreases, and an error occurs. Simultaneously, when the initializing magnetic field is too strong, it also acts on the recording layer 220 and the recording data may be erased. It is insufficient for such a phenomenon even if the reproducing magnetic field and the initializing magnetic field are merely adjusted and this phenomenon also depends on the environment temperature in the apparatus which determines the temperature of the storage medium. That is, when the environment temperature in the apparatus changes to the low temperature side, hysteresis characteristics of the reproducing layer become fat. In order to obtain the same magnetizing characteristics (magnetic flux density), the reproducing magnetic field has to be made strong. On the contrary, when the environment temperature changes to the high temperature side, the hysteresis characteristics of the reproducing layer become thin, so that the reproducing magnetic field has to be weakened in order to obtain the same magnetizing characteristics.

SUMMARY OF THE INVENTION

According to the invention, an optical storage apparatus for optimally setting intensities of an external magnetic field and a reproducing laser power which are used upon reproduction, thereby preventing a level reduction and unreproducibility of a reproduction signal in case of using magnetically induced super resolution and a recording and reproducing method of an optical storage medium are provided.

An optical storage apparatus of the invention uses an optical storage medium having at least a recording layer for recording data and a reproducing layer for reproducing the data recorded in the recording layer on a board. A recording unit records data into the recording layer of the optical storage medium at a recording density smaller than a beam diameter of a laser beam. A reproducing unit combines a reproducing magnetic field and a reproducing laser power which are necessary for reproduction and sets to a best value, thereby reproducing the data recorded in the recording layer of the optical storage medium at a recording density smaller than the beam diameter. In addition, according to the invention, a calibration processing unit is provided, a reproducible state is measured by executing a reproducing operation of the optical storage medium by the reproducing unit while changing the reproducing magnetic field and the reproducing laser power, and a set of best values of the reproducing magnetic field and the reproducing laser power which are used in the reproducing unit is determined on the basis of the measurement result. Consequently, even when the environment temperature in the apparatus changes or a medium having different characteristics is loaded, a situation such that the mask is widened due to the excessive reproducing magnetic field and reproducing laser power and information cannot be read out or the recorded data is erased can be certainly prevented. A current which is supplied to an electromagnet or the like to obtain a reproducing magnetic field is reduced and an electric power consumption of the apparatus can be also reduced. Further, a situation such that the reproducing magnetic field and the reproducing laser power are too weak and the mask is narrowed and an error occurs due to a crosstalk with the adjacent pit can be also certainly prevented.

The calibration processing unit measures the reproducible state while increasing the reproducing magnetic field by using a predetermined minimum reproducing magnetic field Hmin as an initial value in a state where the reproducing laser power is set to a predetermined initial value and determines a best value on the basis of the reproducing magnetic field when the reproducible state is derived. In case of increasing an external magnetic field from the initial value Hmin, when a reproduction signal is taken as an example, a level of the signal which was at a noise level in the beginning increases in association with an increase in the external magnetic field and is stabilized in a reproducible state of a value which is equal to or higher than a threshold value TH. When the external magnetic field is further increased, the signal level is attenuated to a level less than the threshold value TH and characteristics such that the apparatus is deviated from the reproducible state are obtained. Consequently, a reproducing magnetic field within a range of a stable state exceeding the shoulder portion of a leading edge of the signal level is set to the best value. In this case, it is preferable that the calibration processing unit sets a median of the reproducing magnetic field range from a starting magnetic field Hs to an end magnetic field He which are in the reproducible state to a best value Hbest. A calibration processing unit 86 can also use a value (Hs+Hc) obtained by adding a predetermined value Hc to the reproducing magnetic field Hs when the apparatus enters the first reproducible state as a best reproducing magnetic field. That is, the reproducing magnetic field Hs in the shoulder portion of the leading edge which provides the reproducible state is obtained, the predetermined value Hc is added thereto, and a resultant value is set to an almost median in the range of the reproducible state. In this case, since it is unnecessary to change the reproducing magnetic field in the whole range of the reproducible state, the best value of the reproducing magnetic field can be determined in the short time in correspondence to it. Further, the calibration processing unit 86 can also set a value obtained by multiplying the reproducing magnetic field which provides the reproducible state for the first time by a predetermined coefficient exceeding 1 to the best reproducing magnetic field. When the reproducible state cannot be obtained even if the reproducing magnetic field is increased, since the reproducing laser power is improper, the calibration processing unit repeats the measurement of the reproducible state by increasing the reproducing magnetic field while increasing the reproducing laser power step by step.

On the other hand, the calibration processing unit sets a predetermined minimum magnetic field and a minimum reproducing power to initial values, measures the reproducible state while alternately increasing the reproducing magnetic field and the reproducing laser power, and sets the reproducing magnetic field and the reproducing laser power when the reproducible state is obtained to the best values. By alternately increasing the reproducing magnetic field and the reproducing laser power as mentioned above, the time of the calibrating process of the reproducing magnetic field and the reproducing laser power can be shortened. That is, in case of measuring the reproducible state by changing the reproducing magnetic field in a state where the reproducing laser power is fixed, the reproducing laser power is increased for the first time when the reproducible state cannot be measured. It is, therefore, troublesome when the reproducible magnetic field cannot be obtained due to a shortage of the reproducing laser power. On the contrary, by measuring the reproducible state while alternately increasing the reproducing magnetic field and the reproducing laser power, for example, the shortage of the reproducing laser power is promptly solved and the calibrating process can be finished in a short time. In this case, the calibration processing unit sets values obtained by adding predetermined values to the reproducing magnetic field and the reproducing laser power when the reproducible state is obtained for the first time to the best values of the reproducing magnetic field and the reproducing laser power, respectively. The calibration processing unit can also set values obtained by multiplying the reproducing magnetic field and the reproducing laser power when the reproducible state is obtained for the first time by predetermined coefficients exceeding 1 to the best values of the reproducing magnetic field and the reproducing laser power, respectively. The calibration processing unit measures the reproducible state by increasing the reproducing magnetic field step by step on a predetermined value AH unit basis. For example, the calibration processing unit measures the reproducible state by increasing the reproducing magnetic field step by step with at least a resolution of $\Delta H=50$ Oe (oersteds) or less. In this case, the calibration processing unit 86 sets the minimum value Hmin of the reproducing magnetic field into a range from 50 to 100 Oe. The calibration processing unit 86 limits the maximum value Hmin of the reproducing magnetic field into a range from 400 to 500 Oe.

The calibration processing unit measures the reproducible state by increasing a reproducing laser power Pr step by step with at least a resolution which is equal to or less than 0.5 mW. The calibration processing unit 86 sets a minimum value Pmin of the reproducing laser power Pr to a range from 3.0 to 5.0 mW. Further, the calibration processing unit limits the reproducing laser power to a range which does not exceed the maximum light emitting power of a laser diode. The calibration processing unit measures a reproduction signal from a reproducing unit as a measurement of the reproducible state, decides that the apparatus is in the reproducible state when the reproduction signal is equal to or larger than a predetermined threshold value, and determines the best values of the reproducing magnetic field and the reproducing laser power. For example, the calibration processing unit determines that the apparatus is in the reproducible state when a peak detection signal of an RF signal reproduced from the medium return light by the reproducing unit is equal to or larger than the predetermined threshold value.

The calibration processing unit can also determine the best values of the reproducing magnetic field and the reproducing laser power by measuring an error rate of the reproduction signal from the reproducing unit as a measurement of the reproducible state and deciding that the reproducible state when the error rate is equal to or lower than the predetermined threshold value. For example, the calibration processing unit measures the number of bit errors as an error rate by comparing reproduction data by the reproducing unit with recording data at a reproducing position which has preliminarily been known on a bit unit basis and determines that the apparatus is in the reproducible state when the number of bit errors is equal to or lower than the predetermined threshold value. The calibration processing unit determines the best values of the reproducing magnetic field and the reproducing laser power every predetermined zone of the optical storage medium and stores and holds them in a memory. The reproducing unit reads out from the memory the best values of the reproducing magnetic field and reproducing laser power in the zone corresponding to a reproducing position of the optical storage medium and uses them. The reproducing unit can also obtain the best values of the reproducing magnetic field and the reproducing laser power corresponding to the reproducing position of the optical storage medium by linearly approximating the zone read out from the memory and can use the best values. The reproducing unit corrects the best values of the reproducing magnetic field and the reproducing laser power determined by the calibration processing unit in accordance with a temperature in the apparatus upon reproduction and uses the corrected values. The reproducing unit generates the best values of the reproducing magnetic field and the reproducing laser power determined by the calibration processing unit for only a reproducing period in the sector of the optical storage medium in which a reproduction gate signal is ON. The calibration processing unit executes a process for calibrating the reproducing magnetic field when the following timings are discriminated by a calibration timing discriminating unit.

I. at the time of an initialization diagnosing process accompanying a turn-on of a power source of the apparatus II. when the optical storage medium is loaded into the apparatus III. when a change in temperature in the apparatus is equal to or larger than a predetermined value IV. when an elapsed time from the previous calibration is monitored and a predetermined calibration valid time has elapsed V. when a reproduction error occurs and a retrying process is performed VI. at the time of start-up of the apparatus in a factory When an interruption request is generated from the upper apparatus during the calibration of the reproducing magnetic field and the reproducing laser power, the calibration processing unit temporarily interrupts the calibration and restarts the process from the interrupted position after finishing the interrupting process.

According to the invention, there is provided a recording and reproducing method of an optical storage medium, comprising:

a recording step of recording data into a recording layer of the optical storage medium at a recording density smaller than a beam diameter of a laser beam by using an optical storage medium having at least a recording layer for recording data and a reproducing layer for reproducing the data recorded in the recording layer on a board;

a reproducing step of reproducing the data recorded in the recording layer of the optical storage medium at a recording density smaller than the beam diameter by setting a combination of a reproducing magnetic field and a reproducing laser power which are necessary for reproduction into best values; and a calibrating step of measuring a reproducible state by executing a reproducing operation of the optical storage medium while changing the reproducing magnetic field and the reproducing laser power and determining a set of the best values of the reproducing magnetic field and the reproducing laser power on the basis of the measurement result.

In the calibrating step, the reproducible state is measured while increasing the reproducing magnetic field by setting a predetermined minimum reproducing magnetic field to an initial value in a state where the reproducing laser power is set to a predetermined initial value and the best values are determined on the basis of the reproducing magnetic field when the reproducible state is obtained. In the calibrating step, it is also possible to construct in a manner such that the reproducible state is measured while alternately increasing the reproducing magnetic field and the reproducing laser power by setting the predetermined minimum magnetic field and the minimum reproducing laser power to initial values and the best values are determined on the basis of the reproducing magnetic field and the reproducing laser power when the reproducible state is obtained. The other construction is substantially the same as the construction of the apparatus.

The above and other objects, features, and advantages of the present invention will become more apparent from the following detailed description with reference to the drawings.

BRIEF DESCRIPTION OF THE DRAWINGS

FIGS. 3A and 3B are block diagrams of an optical disk drive according to the invention;

FIG. 8 is an explanatory diagram of a reproducing best value storing table in FIG. 5;

FIGS. 17A and 17B are flowcharts for the processing operation of the invention including a calibrating process of a reproducing magnetic field and a reproducing laser power;

DETAILED DESCRIPTION OF THE PREFERRED EMBODIMENT

Figure 2A:
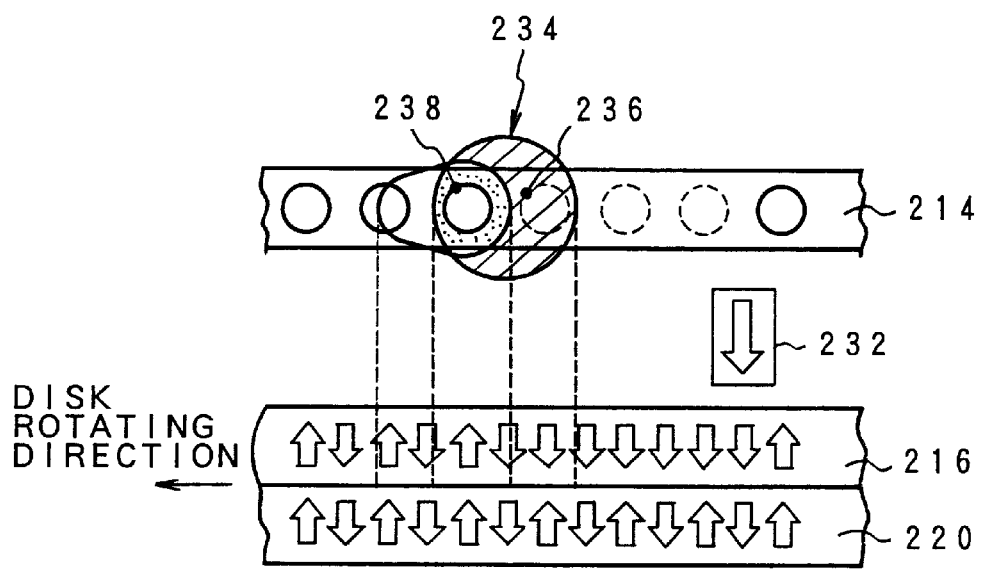
FIGS. 2A and 2B are explanatory diagrams of the reproducing operation of a conventional RAD system.
Figure 3B:
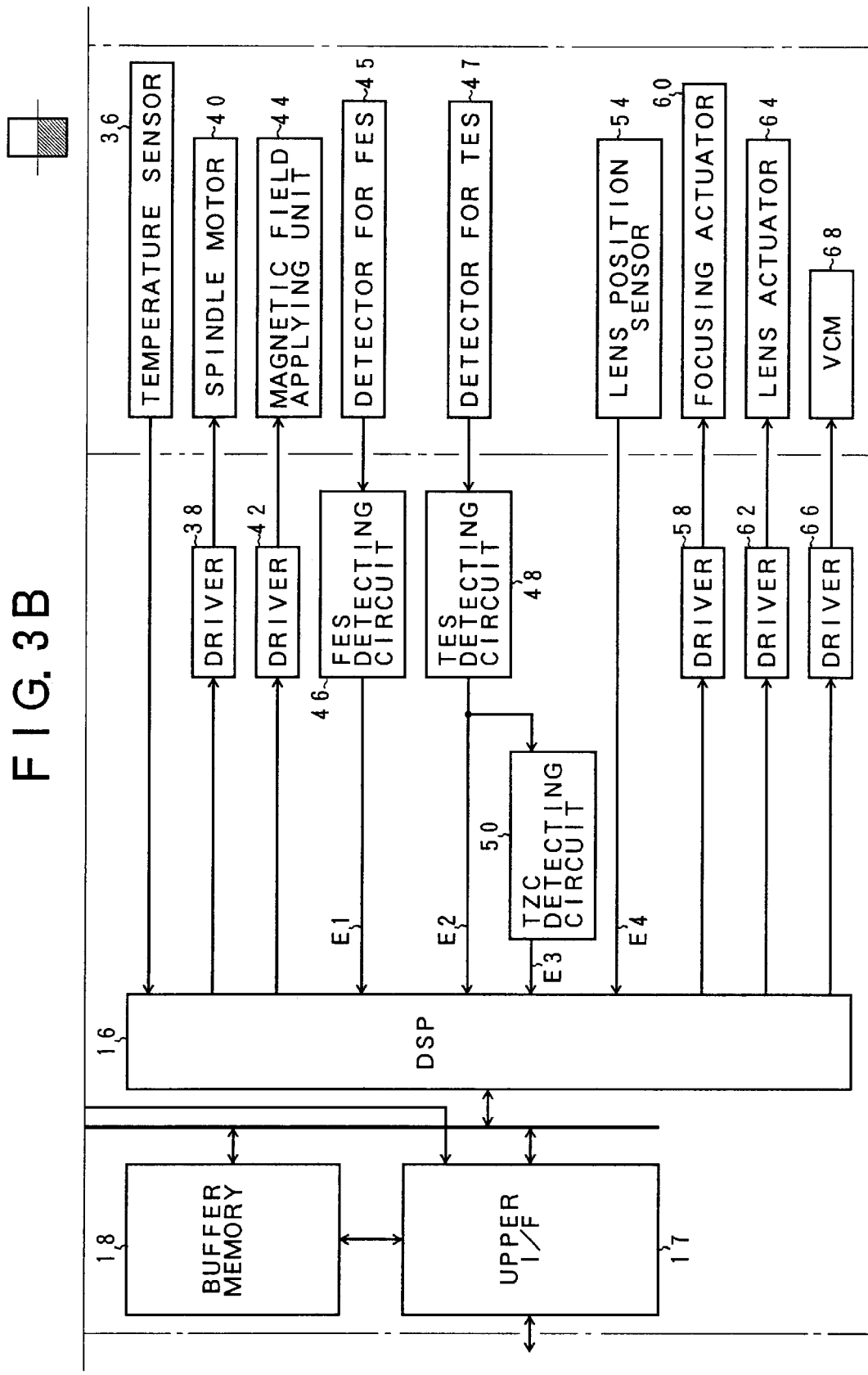

FIGS. 3A and 3B show a circuit block diagram of an optical disk drive serving as an optical storage apparatus of the invention. The optical disk drive of the invention comprises a control unit 10 and an enclosure 11. The control unit 10 comprises: an MPU 12 for performing a whole control of the optical disk drive; an interface 17 for transmitting or receiving a command and data to/from an upper apparatus; an optical disk controller (ODC) 14 for executing processes which are necessary to write and read data to/from an optical disk medium; a DSP 16; and a buffer memory 18. The buffer memory 18 is shared by the MPU 12, optical disk controller 14, and upper interface 17. A formatter 14-1 and an ECC processing unit 14-2 are provided for the optical disk controller 14. At the time of a writing access, the formatter 14-1 divides NRZ write data on a sector unit basis of the medium, thereby forming a recording format. The ECC processing unit 14-2 forms and adds an ECC code on a sector write data unit basis, and, if necessary, forms and adds a CRC code. Further, the ECC processing unit 14-2 converts the ECC encoded sector data into, for example, a (1-7) RLL code. At the time of a reading access, demodulated sector read data is inversely converted from the (1-7) RLL code and the resultant data is CRC checked by the ECC processing unit 14-2. After that, an error is detected and corrected. Further, the NRZ data of the sector unit is connected so as to construct a stream of the NRZ read data by the formatter 14-1 and the stream is transferred to the upper apparatus. A write LSI circuit 20 is provided for the optical disk controller 14. A write modulating unit 21 and a laser diode control unit 22 are provided for the write LSI circuit 20. A control output of the laser diode control unit 22 is supplied to a laser diode unit 30 provided for the optical unit on the enclosure 11 side. The laser diode unit 30 integratedly has a laser diode 30-1 and a detector 30-2 for monitoring. The write modulating unit 21 converts write data into a data format of a PPM recording or a PWM recording. As an optical disk to which the recording and reproduction are performed by using the laser diode unit 30, namely, a rewritable MO cartridge medium, in the embodiment, a magnetooptic recording medium (hereinbelow, referred to as an "FAD medium") having a reproducing layer, a switching layer, and a recording layer of the FAD system in FIG. 1A, a magnetooptic storage medium (hereinbelow, referred to as an "RAD medium") having a reproducing layer and a recording layer of the RAD system in FIG. 2A, or the like is used. A recording format of the medium is a zone CAV. Further, as a recording method of the medium, a pit position recording (PPM recording) for recording data in correspondence to the presence or absence of marks on the medium or a pulse width recording (PWM recording) for making edges, namely, a front edge and a rear edge of the mark correspond to data is used. When the MO cartridge medium is loaded into the optical disk drive, an ID portion of the medium is first read, the kind of medium is recognized in the MPU 12 from its pit interval, and a result of the recognition of the kind is notified to the write LSI circuit 20. Sector write data from the optical disk drive 14 is converted into PWM recording data by the write modulating unit 21. The PWM recording data converted by the write modulating unit 21 is supplied to the laser diode control unit 22 and is written onto the medium by the light emission driving of the laser diode 30-1. As a reading system for the optical disk drive 14, a read LSI circuit 24 is provided. A read demodulating unit 25 and a frequency synthesizer 26 are built in the read LSI circuit 24. A photosensing signal of the return light of a beam from the laser diode 30-1 by a detector 32 for ID/MO provided for the enclosure 11 is inputted as an ID signal and an MO signal to the read LSI circuit 24 through a head amplifier 34. Circuit functions such as AGC circuit, filter, sector mark detecting circuit, and the like are provided for the read demodulating unit 25 of the read LSI circuit 24. A read clock and read data are formed from the inputted ID signal and MO signal. The PWM recording data is demodulated to the original NRZ data. Since the zone CAV is used as a control of a spindle motor 40, a setting control of a frequency dividing ratio to generate a zone corresponding clock frequency is performed to the frequency synthesizer 26 built in the read LSI circuit 24 by the MPU 12. The frequency synthesizer 26 is a PLL circuit having a programmable frequency divider and generates a reference clock having a peculiar frequency which has been predetermined in accordance with a zone position of the medium as a read clock. That is, the frequency synthesizer 26 is constructed by a PLL circuit having a programmable frequency divider and generates a reference clock of a frequency fo according to a frequency dividing ratio (m/n) set in correspondence to the zone number by the MPU 12 in accordance with the following equation.

$$fo = (m/n) \cdot fi$$

In this instance, a frequency dividing value (n) of the denominator of the frequency dividing ratio (m/n) is a peculiar value corresponding to a capacity of the medium. A frequency dividing value (m) of the numerator is a value which changes in accordance with the zone position of the medium and is prepared as table information of the value corresponding to the zone number per medium. The read data demodulated by the read LSI 24 is supplied to the optical disk controller 14. After completion of the inverse conversion of the (1-7) RLL code, a CRC check and an ECC process are performed to the converted data by the encoding function of the ECC processing unit 14-2, so that NRZ sector data is reconstructed. The data is coupled to the stream of the NRZ read data by the formatter 14-1 and, after that, the resultant stream is transferred to the upper apparatus by the upper interface 17 through the buffer memory 18. A detection signal of a temperature sensor 36 provided on the enclosure 11 side is supplied to the MPU 12 via the DSP 16. The MPU 12 controls each of the light emitting powers for reading, writing, and erasing in the laser diode control unit 22 to the best value on the basis of an environment temperature in the apparatus detected by the temperature sensor 36.

The MPU 12 controls the spindle motor 40 provided on the enclosure 11 side by a driver 38 via the DSP 16. Since the recording format of the MO cartridge is the zone CAV, the spindle motor 40 is rotated at a predetermined speed of, for example, 6000 rpm. The MPU 12 also controls a magnetic field applying unit 44 provided on the enclosure 11 side by a driver 42 through the DSP 16. The magnetic field applying unit 44 is arranged on the side opposite to the beam irradiating side of the MO cartridge loaded in the apparatus and supplies an external magnetic field onto the medium upon recording, erasing, and reproduction. As a magnetic field applying unit 44, an electromagnet is ordinarily used. In addition to it, a permanent magnet in which the best magnetic field decided by the calibrating process of the invention is obtained can be also used. Further, a combination of the electromagnet and the permanent magnet can be also used. The external magnetic field upon reproduction by the magnetic field applying unit 44 is a reproducing magnetic field Hr in case of the FAD medium and is an initializing magnetic field Hi in case of the RAD medium. Further, according to the invention, the external magnetic field by the magnetic field applying unit 44 upon reproduction is always calibrated to a combination of the best values of the reproducing magnetic field and the reproducing laser power by a calibration processing unit which is realized as a processing function of the MPU 12.

The DSP 16 has a servo function to position the beam from the laser diode unit 30 to the medium and executes a seeking control to seek the pickup to a target track so as to be on-tracked. The seeking control can be simultaneously executed in parallel with the writing access or reading access in response to an upper command by the MPU 12. In order to realize a servo function of the DSP 16, a detector 45 for FES for receiving the beam return light from the medium is provided for the optical unit on the enclosure 11 side. An FES detecting circuit (focusing error signal detecting circuit) 46 forms a focusing error signal El from a photosensing output of the detector 45 for FES and inputs the signal to the DSP 16. A detector 47 for TES for receiving the beam return light from the medium is provided for the optical unit on the enclosure 11 side. A TES detecting circuit (tracking error signal detecting circuit ) 48 forms a tracking error signal E2 from the photosensing output of the detector 47 for TES and inputs the signal to the DSP 16. The tracking error signal E2 is inputted to a TZC detecting circuit (track zero-cross point detecting circuit) 50 and a track zero-cross pulse E3 is formed and inputted to the DSP 16.

A lens position sensor 54 for detecting a lens position of an objective lens to irradiate a laser beam onto the medium is provided on the enclosure 11 side and inputs a lens position detection signal (LPOS) E4 to the DSP 16. In order to control the position of the beam spot on the medium, the DPS 16 further controls a focusing actuator 60, a lens actuator 64, and a VCM 68 via drivers 58, 62, and 66.

Figure 4:
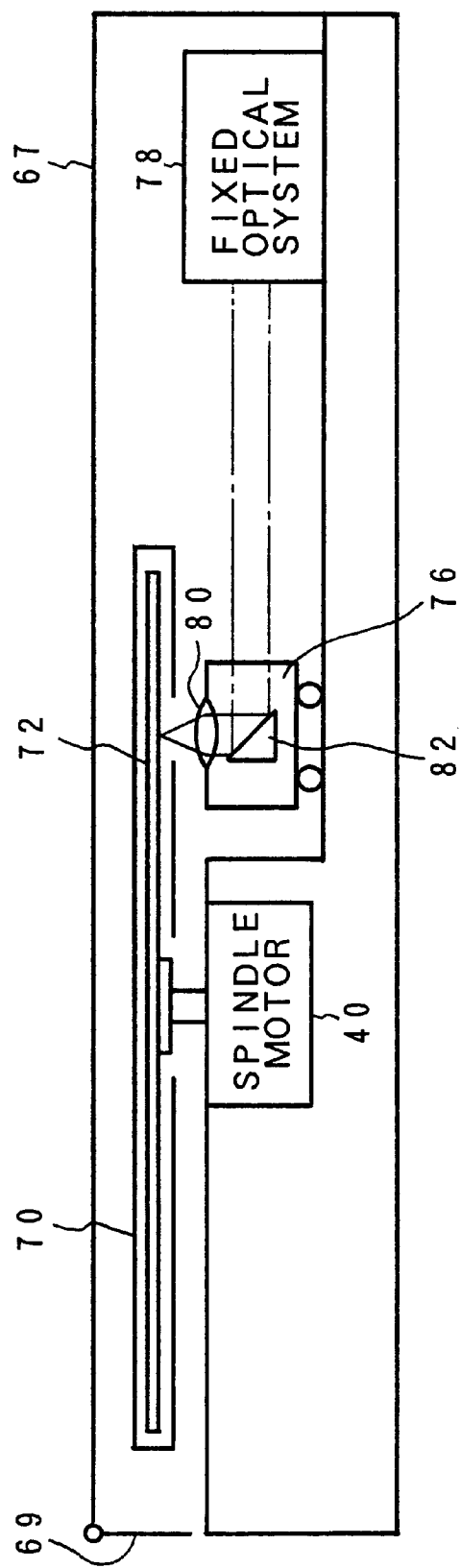
FIG. 4 is an explanatory diagram of an internal structure of an apparatus in which an MO cartridge has been loaded.

An outline of the enclosure 11 is as shown in FIG. 4. The spindle motor 40 is provided in a housing 67. By inserting an MO cartridge 70 from an inlet door 69 side to a hub of a rotary axis of the spindle motor 40, the loading to attach an internal MO medium 72 to the hub of the rotary axis of the spindle motor 40 is executed. A carriage 76 which can be moved by the VCM 68 in the direction which traverses the tracks on the medium is provided under the MO medium 72 of the loaded MO cartridge 70. An objective lens 80 is mounted on the carriage 76 and inputs the beam from the laser diode provided for a fixed optical system 78 via a prism 82, thereby forming a beam spot onto the medium surface of the MO medium 72. The objective lens 80 is moved in the optical axial direction by the focusing actuator 60 provided for the enclosure 11 in FIGS. 3A and 3B and can be moved within a range of, for example, tens of tracks in the radial direction which traverses the medium tracks by the lens actuator 64. A position of the objective lens 80 mounted on the carriage 76 is detected by the lens position sensor 54. The lens position sensor 54 sets a lens position detection signal to 0 at a neutral position where an optical axis of the objective lens 80 directs vertically upward, and generates the lens position detection signals E4 corresponding to the movement amounts of different polarities with respect to the movement to the outer side and the movement to the inner side, respectively.

In FIGS. 3A and 3B, although the lens actuator 64 and VCM 68 are provided as an optical pickup, a pickup comprising only the VCM 68 which does not have the lens actuator 64 is also included.

Figure 5:
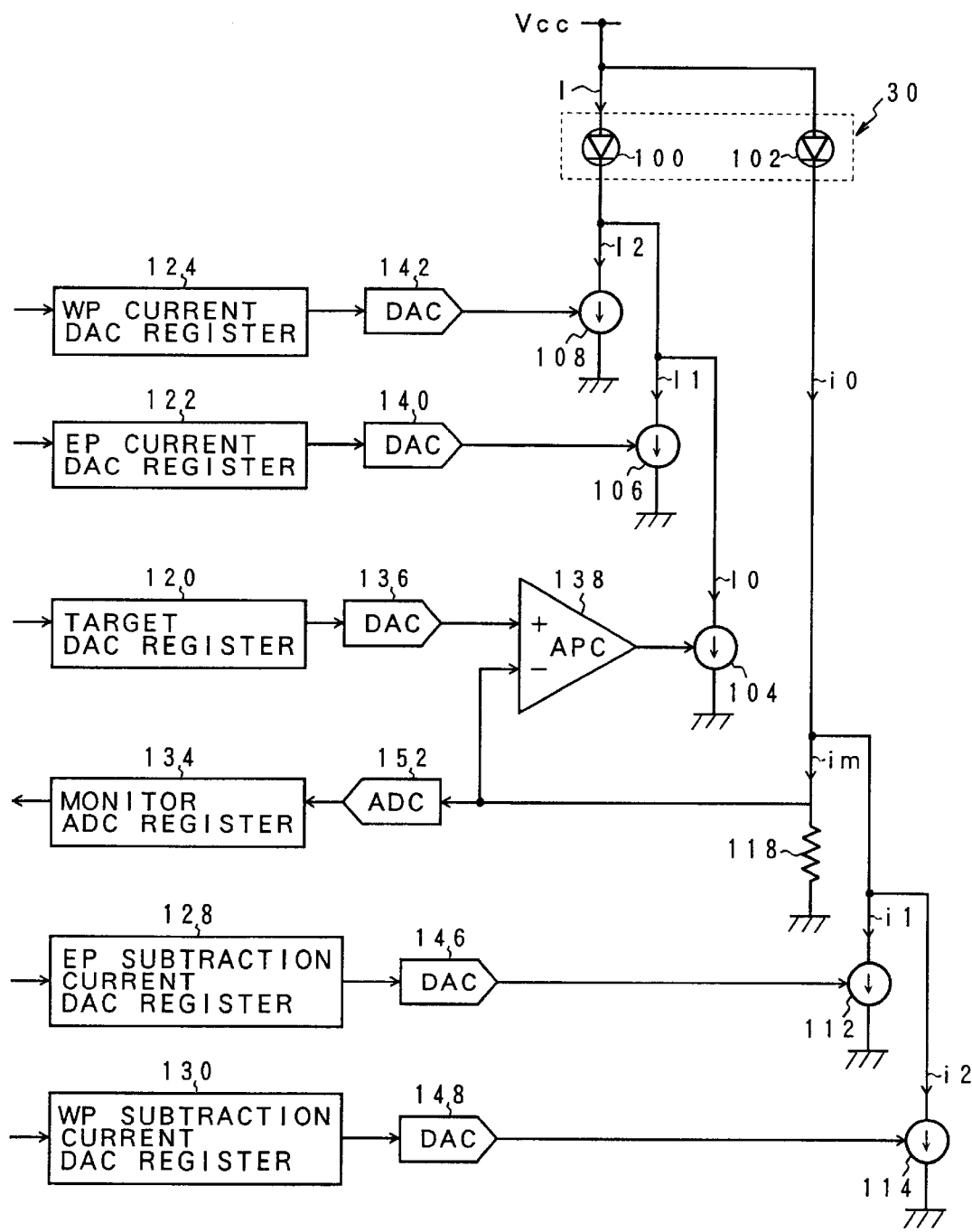
FIG. 5 is a block diagram of a laser diode control circuit in FIGS. 3A and 3B.

FIG. 5 is a circuit block diagram of the laser diode control unit 22 provided in the controller 10 in FIGS. 3A and 3B. A laser diode 100 and a monitor photodiode 102 are integratedly provided for the laser diode unit 30. The laser diode 100 receives a drive current I by a power source voltage Vcc and emits light. A laser beam is generated from the optical unit and is irradiated onto the medium surface, thereby performing the recording and reproduction. The monitor photodiode 102 receives a part of the light from the laser diode 100 and generates a photosensing current iO which is proportional to the light emitting power of the laser diode 100. A reading power current source 104, an erasing power current source 106, and a writing power current source 108 are connected in parallel to the laser diode 100 and supply a reading power current I0, an erasing power current I1, and a writing power current I2, respectively. At the time of the reading power light emission, the reading power current I0 flows. At the time of the erasing power light emission, the current (I0+I1) obtained by adding the erasing power current I1 to the reading power current I0 flows. At the time of the writing power light emission, the current (I0+I2) obtained by adding the writing power current I2 to the reading power current I0 flows. An automatic power control unit (hereinafter, abbreviated to "APC") 138 is provided for the reading power current source 104. A specified target reading power as a target power is set into the APC 138 through a target DAC register 120 and a D/A converter (hereinafter, abbreviated to "DAC") 136. An EP current DAC register 122 and a DAC 140 are provided as an EP current instructing unit for the erasing power current source 106. A WP current DAC register 124 and a DAC 142 are provided as a WP current instructing unit for the WP current source 108. Therefore, the currents of the current sources 104, 106, and 108 can be properly changed by setting DAC instruction values for the corresponding registers 120, 122, and 124, respectively. A light emission current source circuit is constructed by the register, DAC, and constant current source. As a control by the APC 138, a feedback control is executed so that a monitor current im derived from the photosensing current iO of the photodiode 102 coincides with the target voltage of the DAC 136 corresponding to the target reading power. For this purpose, subtraction current sources 112 and 114 are provided for the monitor photodiode 102 in order to subtract the photosensing currents when the light emission is performed by the erasing power and writing power exceeding the reading power and feed back the monitor current im corresponding to the reading power to the APC. An arbitrary subtraction current I1 can be set for the subtraction current source 112 for the erasing power by an EP subtraction DAC register 128 and a DAC 146 as an EP subtraction current instructing unit. An arbitrary subtraction current i2 can be set for the subtraction current source 114 for the writing power by a WP subtraction DAC register 130 and a DAC 148 as a WP subtraction current instructing unit. The monitor currents im in the light emitting modes of the two subtraction current sources i1 and i2 are as follows.

I. At the time of the reading power light emission: im=iO

II. At the time of the erasing power light emission: im=iO−i1

III. At the time of the writing power light emission: im=iO−i2

Therefore, even at the time of the light emission of any one of the erasing power and the writing power exceeding the target reading power, by subtracting the corresponding subtraction current from the photosensing current iO, the monitor current im flows in a resistor 118 for detecting a monitor voltage as a current corresponding to the reading power and is fed back to the APC 138. Therefore, irrespective of the light emitting power, the APC 138 controls the reading power current source 104 so as to always maintain the target reading power, thereby realizing the automatic power control of the specified erasing power and writing power. With respect to the subtraction currents as well, a subtraction current source circuit is constructed by the register, DAC, and constant current source. The monitor voltage by the monitor voltage detecting resistor 118 corresponding to the monitor current im is converted into digital data by an A/D converter (hereinafter, abbreviated to "ADC") 152 and is inputted to a monitor ADC register 134. After that, it is read out to the MPU 12 side. Therefore, the ADC 152 and monitor ADC register 134 construct a measuring unit of the monitor current im.

Figure 6:
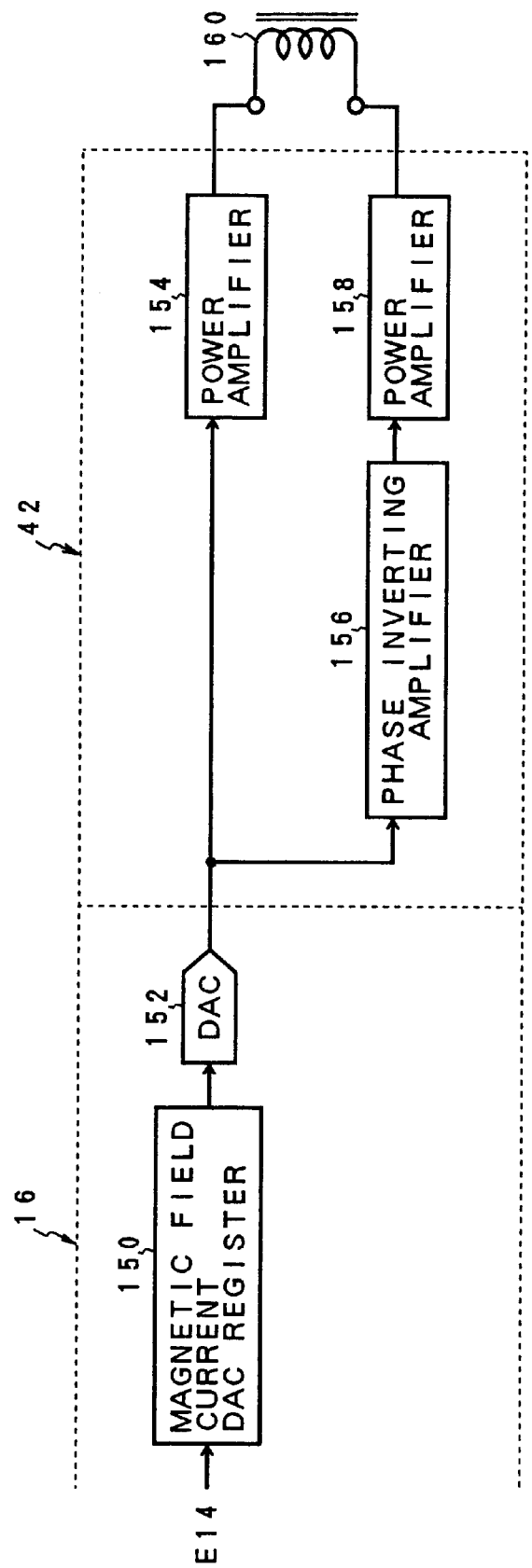
FIG. 6 is a block diagram of a driver of a magnetic field applying unit in FIGS. 3A and 3B.

FIG. 6 is a circuit block diagram on the side of the driver 42 and DSP 16 for forming a reproducing magnetic field by supplying a drive current to the magnetic field applying unit 44 in FIGS. 3A and 3B. A magnetic field current DAC register 150 and the A/D converter 152 are provided on the DSP 16 side. A current instruction value corresponding to the reproducing magnetic field is set into the magnetic field current DAC register 150 by an instruction from the MPU 12 side. The A/D converter 152 converts the instruction value of the magnetic field current DAC register 150 into an analog signal and outputs to the driver 42. A power amplifier 154, a phase inverting amplifier 156, and a power amplifier 158 are provided for the driver 42. In the embodiment, an electromagnet 160 is used as a magnetic field applying unit 44 in FIGS. 3A and 3B. An output signal from the ADC 152 has, for example, a plus signal polarity, is amplified by the power amplifier 154, and is outputted as a drive signal of the plus polarity to one end of the electromagnet 160. On the other hand, the output signal of the plus polarity from the ADC 152 is inverted by the phase inverting amplifier 156 and has a minus polarity. This signal is amplified by the power amplifier 158 and the drive signal of the minus polarity is outputted to the other end of the electromagnet 160. Thus, a drive current flows in the electromagnet 160 from the plus polarity of the drive signal of the power amplifier 154 toward the minus polarity serving as a driving polarity of the power amplifier 158. A value of the current flowing in the electromagnet 160 is varied in accordance with a level of the drive signal and a reproducing magnetic field according to the current value can be produced.

Figure 1A:
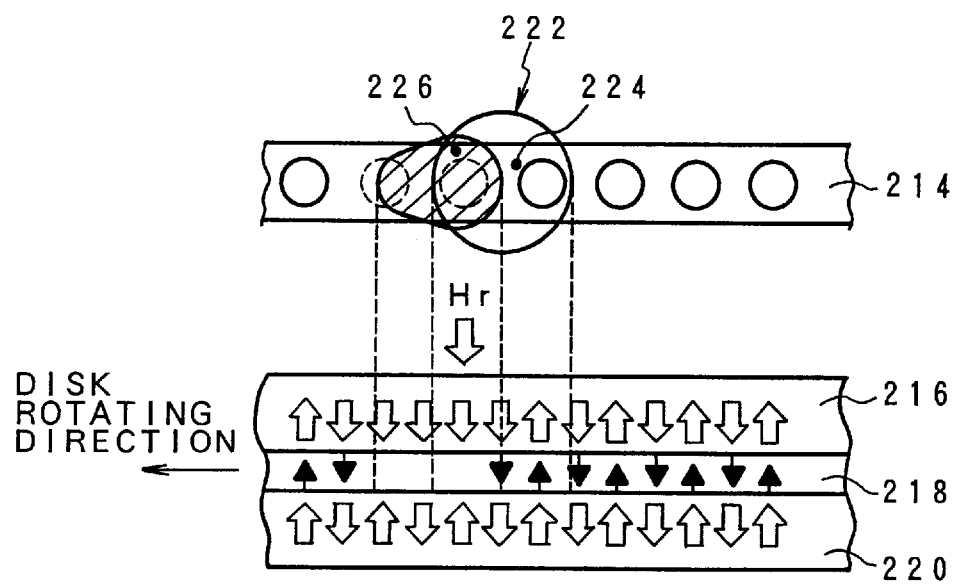
FIGS. 1A and 1B are explanatory diagrams of the reproducing operation of a conventional FAD system.
Figure 1B:
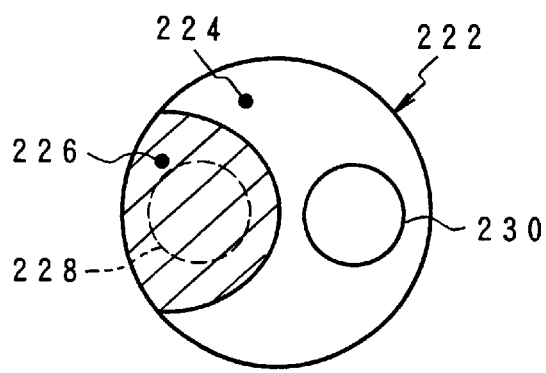
Figure 7:
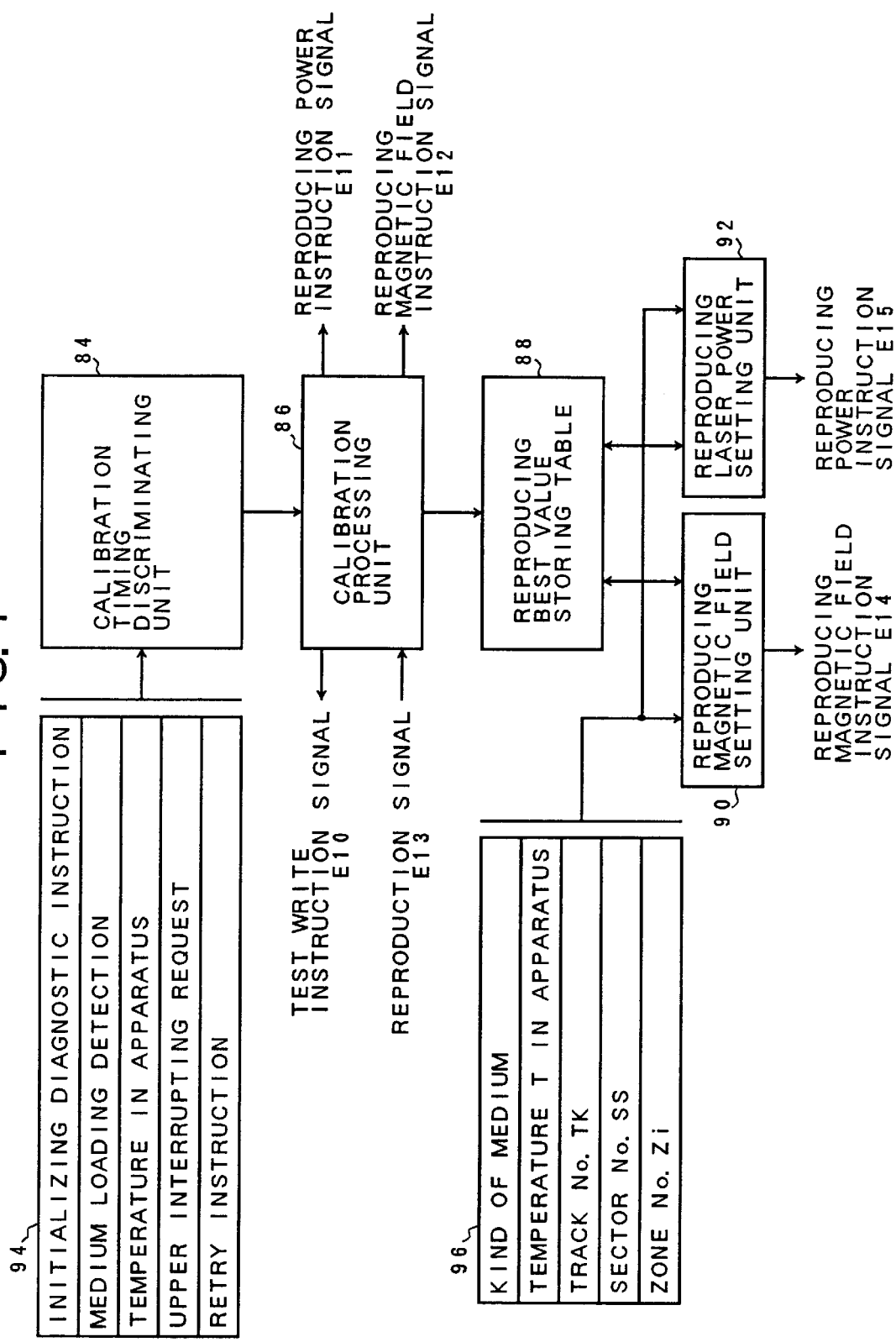
FIG. 7 is a functional block diagram of a calibration processing unit which is realized by an MPU in FIGS. 3A and 3B.

FIG. 7 is a functional block diagram of a calibrating process for optimizing the reproducing magnetic field and the reproducing laser power which are realized by the processing function of the MPU 12 in FIGS. 3A and 3B with respect to the FAD medium in FIGS. 1A and 1B as an example. A calibration timing discriminating unit 84, the calibration processing unit 86, a reproducing best value storing table 88, a reproducing magnetic field setting unit 90, and a reproducing laser power setting unit 92 are provided by the processing function of the MPU 12. The calibration timing discriminating unit 84 sets processing timings for the calibrating processes of the reproducing magnetic field and the reproducing laser power in accordance with the set contents stored in a register group 94 and activates the calibration processing unit 86. An initialization diagnosing instruction, a medium insertion detection, a temperature in the apparatus, an upper interrupting request, and a retrying instruction have been registered in the register group 94. Those register contents are read out by the calibration timing discriminating unit 84 and the calibration processing unit 86 is activated. For example, the calibration timing discriminating unit 84 monitors the elapsed time from the previous calibrating process when the initialization diagnosis is executed in association with the turn-on of the apparatus power source, when the loading is detected by the insertion of the FAD medium, or when a change in temperature in the apparatus is equal to or larger than a predetermined value, thereby discriminating a timing when a predetermined calibration valid time elapses, a timing when a reproduction error occurs and the retrying process is executed, or the like as a calibration timing. In the other cases, for example, in the testing operation at the time of start-up in a factory when the apparatus is completed and initialized at the factory stage, it is also possible to activate the calibration processing unit 86 by allowing the calibration timing discriminating unit 84 to discriminate the calibration timing by setting a dip switch or the like. Further, when the upper interrupting request such as read command, write command, or the like is received from the upper apparatus, the calibration timing discriminating unit 84 discriminates whether the calibration processing unit 86 is executing the process at that time or not. If the calibrating process is being performed, the calibrating process is once interrupted. A priority is given to the read or write access by the upper interrupting request. After completion of the access, the calibration processing unit 86 is allowed to restart the calibrating process from the interrupted time point. The calibration processing unit 86 operates by receiving an activating request of the calibrating process from the calibration timing discriminating unit 84. In the calibrating process, after a test pattern which is used for the calibrating process was first written into a predetermined test track of the optical storage medium, the reproducing operation is executed while changing the reproducing magnetic field and the reproducing laser power step by step. The reproducible state is discriminated from the reproduction signal which is derived by the reproducing operation. The best values are determined on the basis of the reproducing magnetic field and the reproducing laser power in the reproducible state. The decided best values are stored into the reproducing best value storing table 88.

As processing modes in the calibration processing unit 86, there are the following two modes.

Processing Mode 1

The reproducible state is measured by increasing the reproducing magnetic field step by step in a state where the reproducing laser power is fixed. When the reproducible state cannot be measured even if the reproducing magnetic field is increased up to the maximum value, the process for in creasing the reproducing magnetic field to the maximum value step by step is repeated every reproducing laser power while increasing the reproducing laser power step by step.

Processing Mode 2

After the minimum magnetic field and the minimum reproducing power were set as initial values, the reproducible state is measured while alternately increasing the reproducing magnetic field and the reproducing laser power step by step.

There is the following difference between the processing modes 1 and 2 of the calibration processing unit 86. That is, in the processing mode 1, although it takes a longer time for the calibrating process, the accurate best values can be determined. On the other hand, in the processing mode 2, since the reproducing magnetic field and the reproducing laser power are alternately increased step by step until the reproducible state is obtained, the reproducing state can be formed and the best values can be determined in a short time. The measurement of the reproducible state to decide the best values of the reproducing magnetic field and the reproducing laser power by the calibration processing unit 86 is executed by either one of the following two methods.

(1) Measurement of the level of the reproduction signal (2) Error rate

As for the reproduction signal, for instance, the peak level of the MO signal which is obtained as an RF signal from the head amplifier 34 in FIGS. 3A and 3B is detected and when it is equal to or larger than a predetermined threshold value, the reproducible state is determined. Specifically speaking, the peak level of the MO signal is detected, a carrier to noise ratio CNR is measured. When the CNR value is equal to or larger than a predetermined threshold value, the reproducible state is determined. As for the error rate, the recording data which has been recorded as a test pattern and has previously been known and the reproduction data read out from the test pattern recording area, specifically speaking, the read data from the read LSI circuit 24 in FIGS. 3A and 3B are compared on a bit unit basis and the number of bit errors is measured. When the number of bit errors is equal to or less than a predetermined threshold value, the reproducible state is determined. Besides the discrimination about the reproducing state based on the level of the peak detection signal of the reproduction RF signal or the number of bit errors, the reproducible state can be also discriminated by a method whereby the number of correction errors for the reproduction data in the ECC processing unit 14-2 provided for the optical disk controller 14 in FIGS. 3A and 3B is used and when the number of correction errors is equal to or less than a predetermined value, the reproducible state is decided. For the calibrating process to decide the best values of the reproducing magnetic field and the reproducing laser power by the calibration processing unit 86 as mentioned above, a test write instruction signal E10 to write the test pattern onto the medium, a reproducing power instruction signal E11 to change the reproducing power, and a reproducing magnetic field instruction signal E12 to change the reproducing magnetic field are outputted from the calibration processing unit 86. Further, a reproduction signal E13 to discriminate the reproducible state is inputted. A set of the best values of the reproducing magnetic field and the reproducing laser power determined by the calibration processing unit 86 is registered in the reproducing best value storing table 88.

FIG. 8 shows a specific example of the reproducing best value storing table 88. The optical storage medium is divided into n zones of Z1 to Zn like a zone number i. Reproducing magnetic field instruction values Hr1 to Hrn and reproducing power instruction values Pr1 to Prn which give the best values of the reproducing magnetic field and the reproducing laser power determined by the calibrating process have been stored every zone in the table 88. It is now desirable that the test track which is used for the calibrating process to obtain the reproducing best value storing table 88 as shown in FIG. 8 is set to the head track or final track of a boundary of each zone. The reason why the calibrating process of the reproducing magnetic field and the reproducing laser power is executed in the head or final track of the zone as mentioned above is to simplify an arithmetic operating process when the best values of an arbitrary track in FIG. 7 are calculated by a linear interpolation in the reproducing magnetic field setting unit 90 and reproducing laser power setting unit 92 in FIG. 7.

Figure 9:
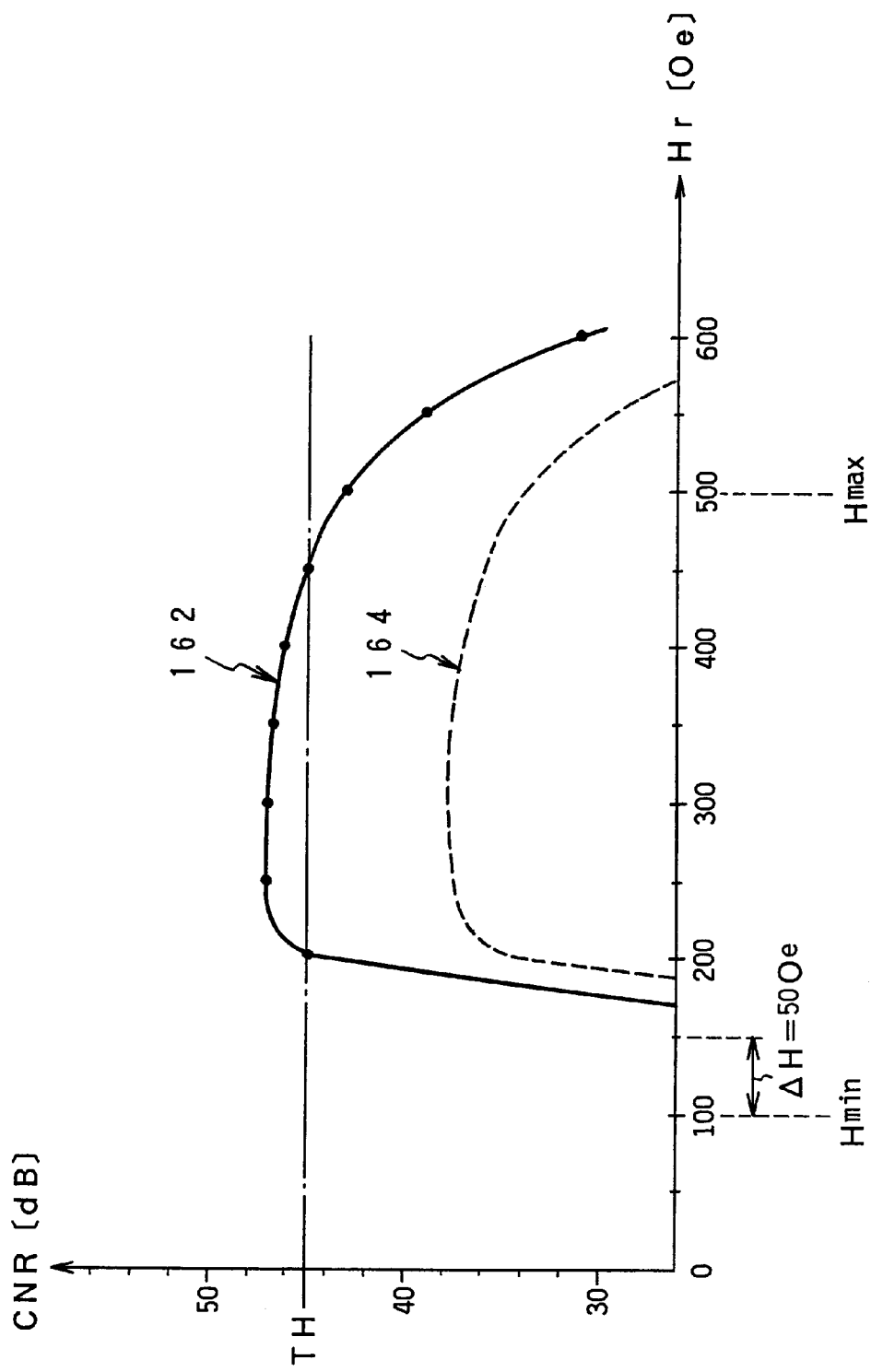
FIG. 9 is a characteristics graph of a CNR value of a reproduction signal for increase in reproducing magnetic field in the calibrating process in FIG. 7.

FIG. 9 shows measurement results in the processes of the set values of the reproducing magnetic field and the reproducing laser power by the calibration processing unit 86 in FIG. 7 and shows an example of measurement results of the carrier to noise ratio CNR of the reproduction signal. The processing mode of the calibrating process in this case relates to a process for fixing the reproducing laser power in the processing mode 1 and increasing the reproducing magnetic field step by step.

In FIG. 9, the reproducing laser power is increased step by step from the set initial value, for example, the minimum magnetic field Hmin=100 Oe to the maximum magnetic field Hmax=500 Oe by a width of $\Delta H$=50 Oe. In measuring characteristics 162, after the test pattern was written onto the test track of the medium by the writing power Tw=7.0 mW, in a state where the reproducing laser power Pr=3.5 mW is set, the reproducing magnetic field is changed on a unit basis of $\Delta H$=50 Oe, and measurement values in this state are plotted. As will be obviously understood from the measuring characteristics 162, when the reproducing magnetic field is equal to the minimum value Hmin=100 Oe, the CNR value is extremely small and the unreproducible state is derived. However, when the reproducing magnetic field is increased to 200 Oe, the CNR value rapidly increases and reaches, for example, TH=45 dB set as a threshold value TH to discriminate the reproducible state. In case of the reproducing magnetic field of 200 Oe or more, the CNR value exceeding TH=45 dB is maintained. However, when exceeding 450 Oe, the CNR value is lower than the threshold value TH=45 dB. Measuring characteristics 164 are derived in the case where the reproducing laser power Pr is improper. Even if the reproducing magnetic field is increased step by step in this case, the CNR value does not exceed the threshold value TH to discriminate the reproducible state. Therefore, if a measurement result like measuring characteristics 164 is obtained, after the reproducing laser power Pr at that time was increased by one stage, the reproducing magnetic field is increased step by step. This process is repeated until the measurement result exceeds the threshold value TH like measuring characteristics 162. As shown in the measuring characteristics 164, as for an increase width $\Delta Pr$ of the reproducing laser power Pr in an unmeasurable state where the CNR value exceeding the threshold value TH cannot be derived, it is desirable to increase it step by step by a resolution of at least 0.5 mW or less. With regard to a change width $\Delta Hr$ of the reproducing magnetic field as well, it is desirable to increase from the measuring characteristics in FIG. 9 step by step by a resolution of $\Delta H$=50 Oe or less. As a minimum value Hmin when the reproducing magnetic field is increased step by step, since the increase in CNR value exceeding the threshold value TH generally occurs from a value about 200 Oe, it is sufficient to set Hmin into a range of about 50 to 100 Oe. As a maximum value Hmax of the reproducing magnetic field, the CNR value starts to largely decrease when exceeding 400 Oe and, if the maximum value Hmax of the reproducing magnetic field upon calibration is too large, it exerts an adverse influence on the medium. Therefore, the reproducing magnetic field is limited to a range of about 400 to 500 Oe so as not to exceed 500 Oe.

Figure 10:
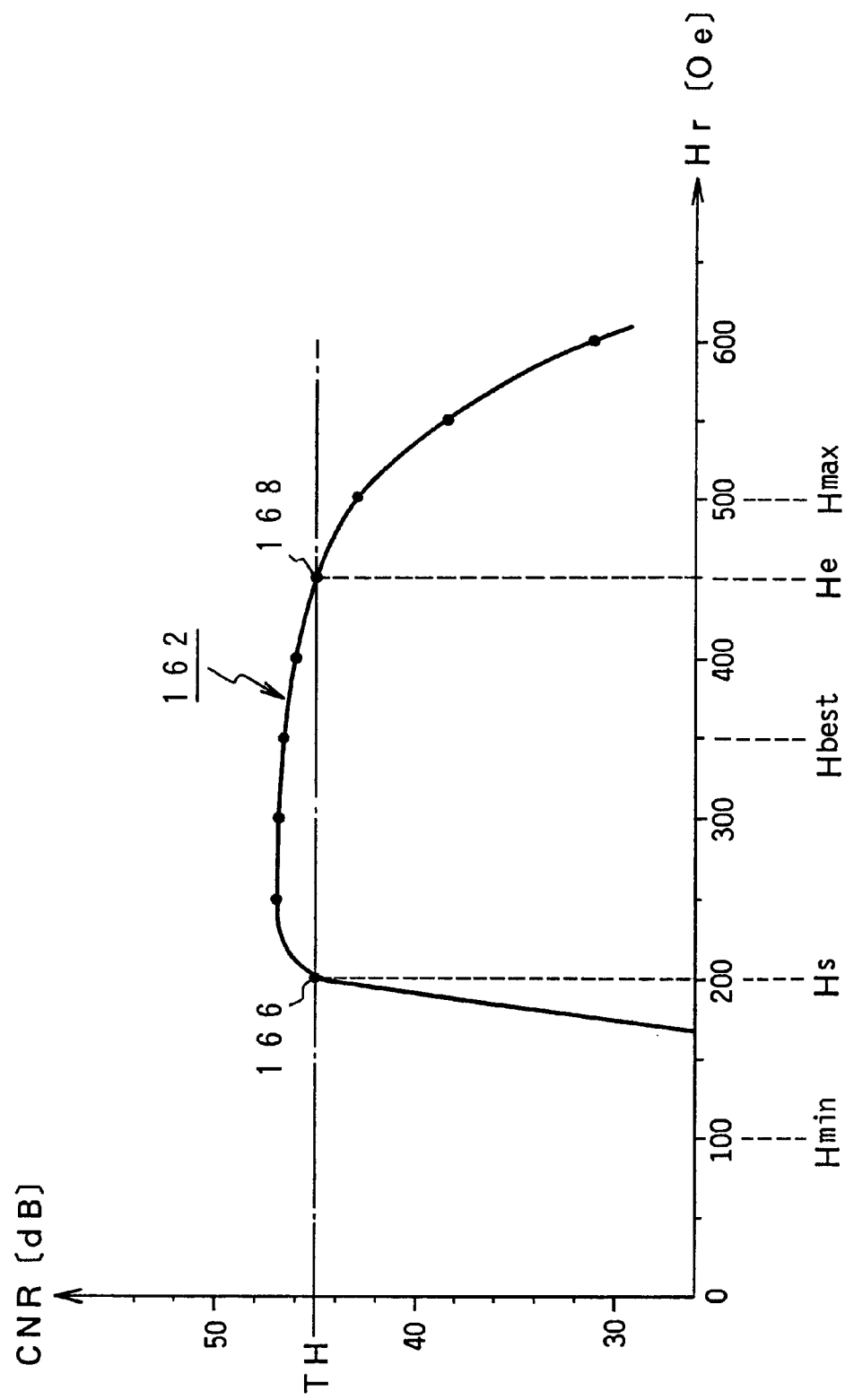
FIG. 10 is an explanatory diagram of a calculating process of the best value of a reproducing magnetic field based on CNR characteristics in FIG. 9.

FIG. 10 is an explanatory diagram of a calculating process of the best value Hbest of the reproducing magnetic field based on the measuring characteristics 162 in FIG. 9. In this case, the reproducing magnetic field is increased from the minimum value Hmin=100 Oe step by step on a unit basis of $\Delta H$=50 Oe. The starting magnetic field Hs of the measurable state at a measuring point 166 where the CNR value has first exceeded the threshold value TH and the end magnetic field He of the reproducible state at a measuring point 168 just before the CNR value is lower than the threshold value TH after that are obtained, respectively. When the starting magnetic field Hs and end magnetic field He of the measurable state exceeding the threshold value TH are obtained, the median between them is set to the best value Hbest. That is, Hbest is calculated by the following equation.

$$Hbest=Hs+(He-Hs)/2$$

Figure 11:
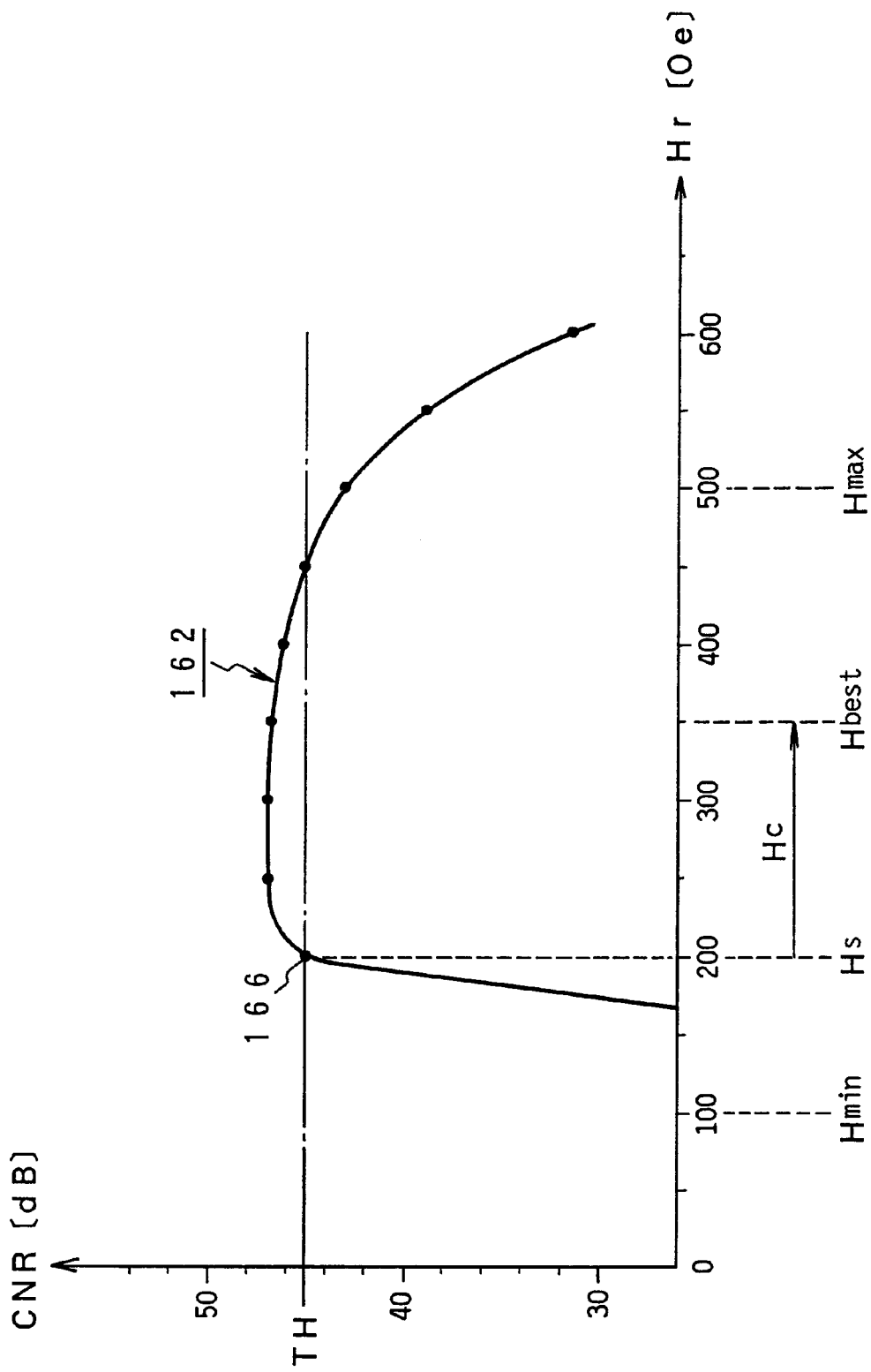
FIG. 11 is an explanatory diagram of another calculating process of the best value of the reproducing magnetic field based on the CNR characteristics in FIG. 9.

FIG. 11 shows another calculating process of the best value Hbest of the reproducing magnetic field based on the measuring characteristics 162 in FIG. 9. In this case, at a time point when the starting magnetic field Hs of the reproducible state where the CNR value when the reproducing magnetic field is increased step by step is equal to or larger than the threshold value TH is obtained, the value obtained by adding a predetermined value Hc to the starting magnetic field Hs is set to the best value Hbest. That is, $$Hbest=Hs+Hc$$

Therefore, the best value Hbest can be determined at a time point when the starting magnetic field Hs at the measuring point 166 of the reproducible state where the CNR value is equal to or larger than the threshold value TH is obtained. The measuring process which is executed while increasing the reproducing magnetic field furthermore is unnecessary. The calibrating process to determine the best values of the reproducing magnetic field and the reproducing laser power can be performed in a short time. In case of FIG. 11, since there is a fear such that if the reproducible state is discriminated at one point where the CNR value exceeds the threshold value TH, it is unstable, for example, it is sufficient to calculate the best value Hbest by adding the predetermined value Hc when the measurement value of the CNR exceeding the threshold value TH continues with respect to two points.

Figure 12:
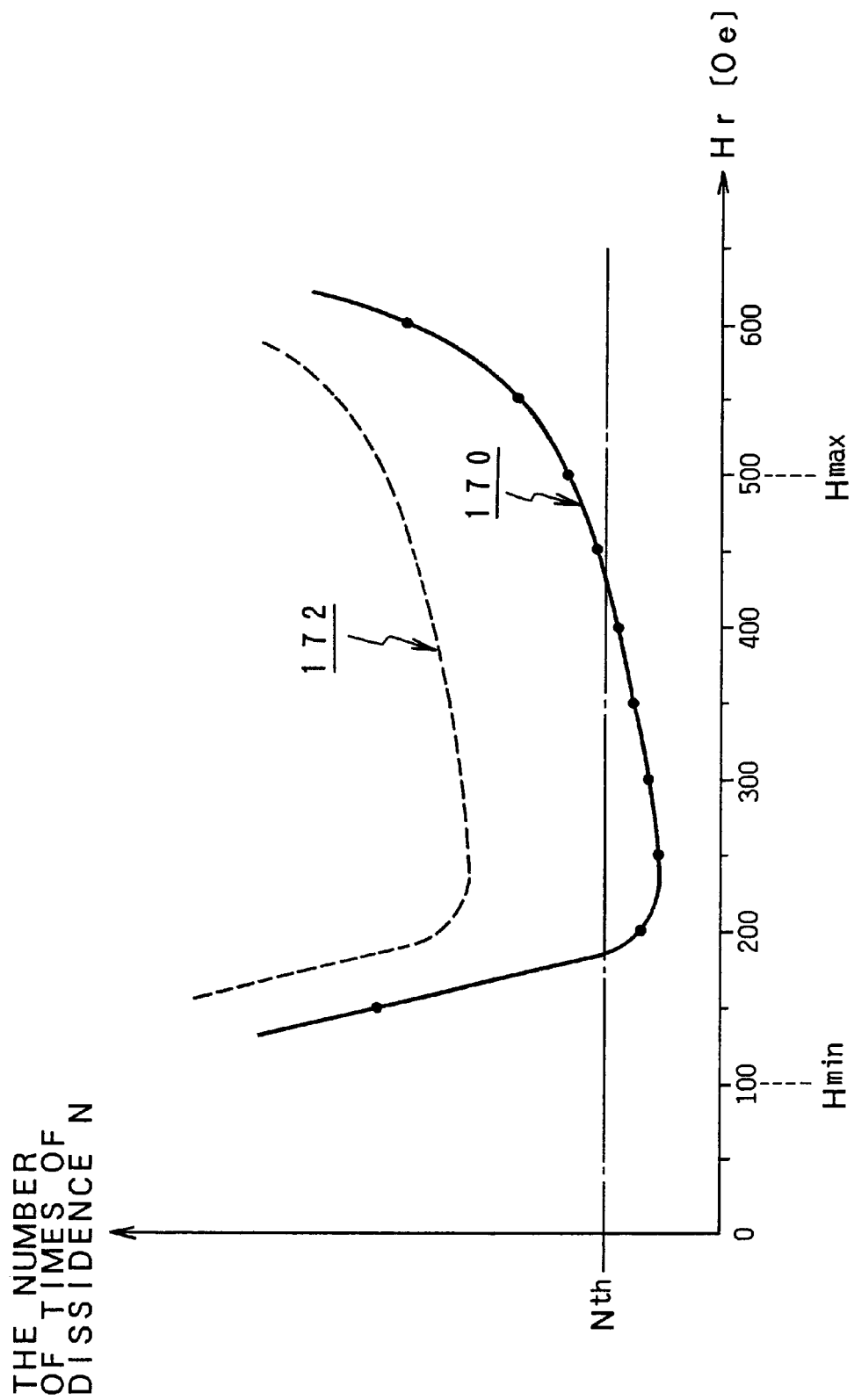
FIG. 12 is a characteristics graph of the number of times of bit dissidence of a reproduction signal for an increase in reproducing magnetic field in the calibrating process in FIG. 7.

FIG. 12 shows other measurement values to decide the best values of the reproducing magnetic field and the reproducing laser power by the calibration processing unit 86 in FIG. 7. The number of bit errors is measured as an error rate of the reproduction signal. In this case, an axis of abscissa denotes the reproducing magnetic field Hr. For example, the reproducing magnetic field is increased from the minimum magnetic field Hmin=100 Oe to the maximum value Hmax=500 Oe on a unit basis of $\Delta Hr$=50 Oe. In a manner similar to FIG. 10, the reproducing laser power Pr is read out by fixing the test pattern of a writing power PW=7 mW to the reproducing laser power Pr=3.5 mW. An axis of ordinate indicates the number N of times of dissidence showing the number of bit errors. Measuring characteristics 170 are obtained in the case where the reproducing laser power Pr is proper. In this case, when the reproducing magnetic field is increased step by step from the minimum value Hmin=100 Oe on a unit basis of $\Delta Hr$=50 Oe, the measuring characteristics 170 of the number N of times of dissidence are equal to or less than a threshold value Nth at a value before 200 Oe. After that, although the reproducible state where the reproducing magnetic field is equal to or less than the threshold value Nth is maintained up to 400 Oe, there is a tendency such that the number N of times of dissidence increases for an increase in reproducing magnetic field. When exceeding 400 Oe, the number N of times of dissidence exceeds the threshold value Nth. When exceeding 500 Oe, the unreproducible state where the number of times of dissidence remarkably increases occurs. Measuring characteristics 172 relate to the case where the reproducing laser power Pr is improper. Even if the reproducing magnetic field is increased in this case, the number N of times of dissidence does not decrease to a value which is equal to or lower than the threshold value TH. In such a case, the process for increasing the reproducing magnetic field step by step while increasing the reproducing laser power Pr on a unit basis of, for example, ΔPr=0.5 mW is repeated. The measuring characteristics of the number N of times of dissidence of the threshold value Nth or less such as measuring characteristics 170 are obtained.

Figure 13:
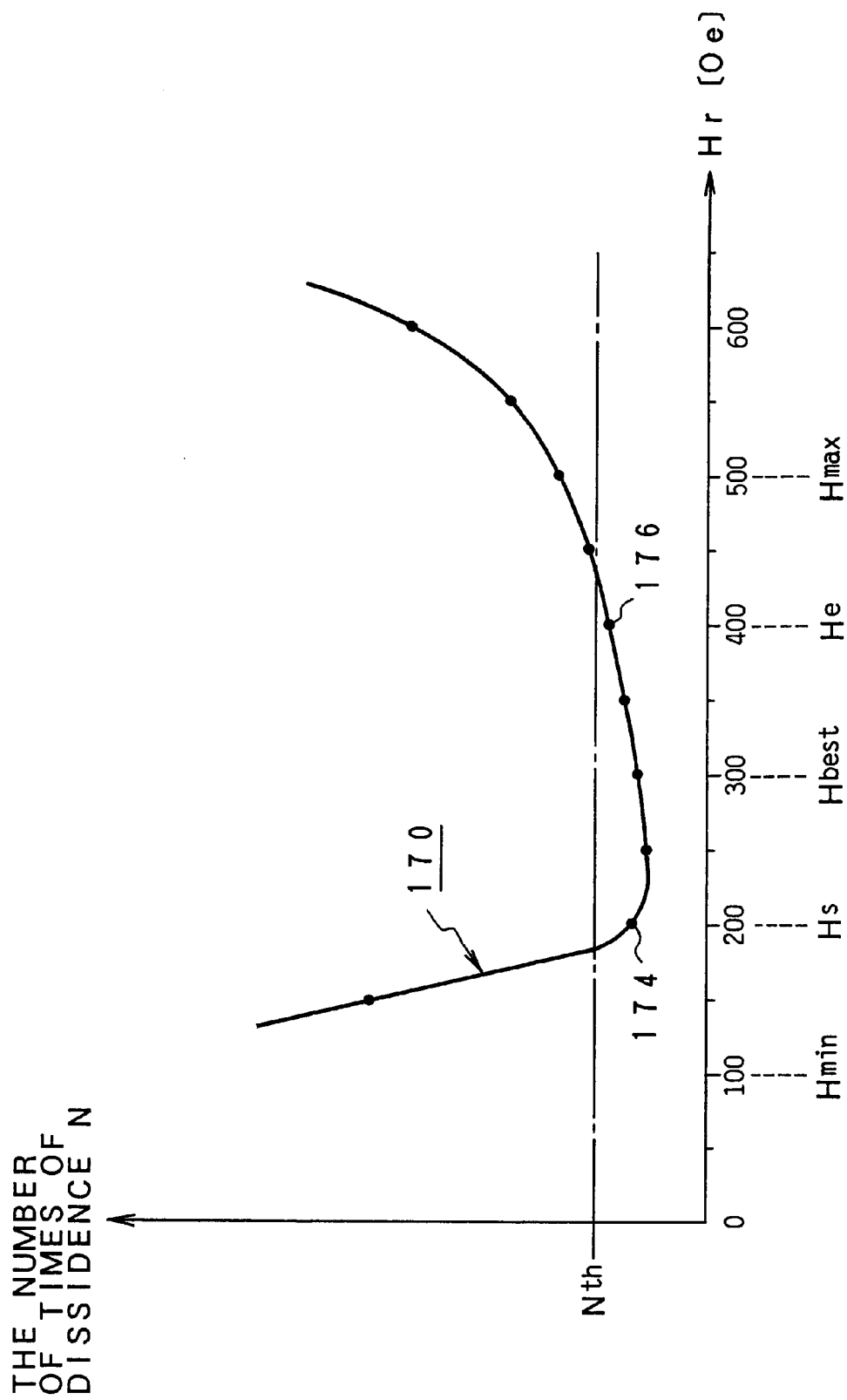
FIG. 13 is an explanatory diagram of a calculating process of the best value of the reproducing magnetic field based on the characteristics of the number of times of bit dissidence in FIG. 12.

FIG. 13 shows an example of a calculating process of the best value Hbest of the reproducing magnetic field Hr based on the characteristics 170 of the number N of times of dissidence in FIG. 12. In this case, the starting magnetic field Hs of the reproducible state at a first measuring point 174 where the number N of times of dissidence is equal to or less than the threshold value Nth is obtained while increasing the magnetic field step by step. Subsequently, the reproducing magnetic field is increased step by step, thereby obtaining the end magnetic field He of the reproducible state at a measuring point 176 just before the measurement value of the number N of times of dissidence exceeds the threshold value Nth. The best value $$Hbest=Hs+(He-Hs)/2$$

is obtained.

Figure 14:
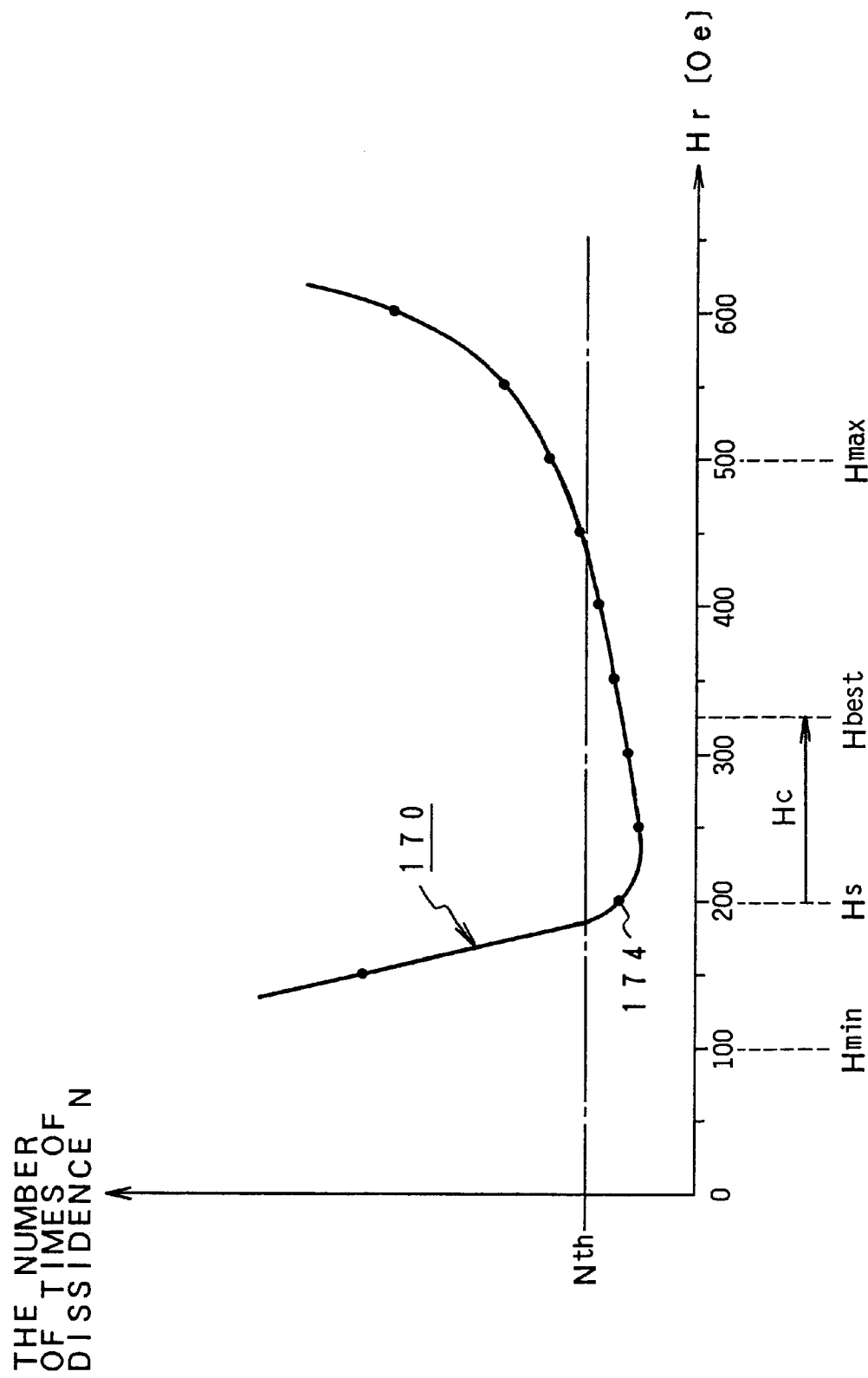
FIG. 14 is an explanatory diagram of another calculating process of the best value of the reproducing magnetic field based on the characteristics of the number of times of bit dissidence in FIG. 12.

FIG. 14 shows another calculating process of the best value of the reproducing magnetic field based on the measuring characteristics 170 of the number N of times of dissidence in FIG. 12. In this case, the starting magnetic field Hs of the reproducible state at the measuring point 174 where the measurement result of the number N of times of dissidence is lower than the threshold value Nth for the first time is obtained. The best value $$Hbest=Hs+Hc$$

is obtained.

Referring again to FIG. 7, the reproducing magnetic field setting unit 90 and reproducing laser power setting unit 92 execute the reproducing operation of the optical storage medium on the basis of the set of the best values of the reproducing magnetic field instruction value and the reproducing power instruction value corresponding to the zone number as shown in FIG. 8 stored in the reproducing best value storing table 88 determined by the calibrating process by the calibration processing unit 86. In this reproducing process, the medium access for reproduction based on the medium kind, the temperature T in the apparatus, a track number TK, a sector number SS, and a zone number Zi stored in the register group 94 is executed. In this case, the reproducing magnetic field setting unit 90 and reproducing laser power setting unit 92 obtain corresponding reproducing magnetic field instruction value Hri and reproducing power instruction value Pri with reference to the reproducing best value storing table 88 using the zone number Zi of the register group 94 and output as a reproducing magnetic field instruction signal E14 and a reproducing power instruction signal E15, respectively. The reproducing magnetic field instruction signal E14 which is outputted from the reproducing magnetic field setting unit 90 is set into the magnetic field current DAC register 150 of the DSP 16 shown in FIG. 6 and is converted into an analog signal by the ADC 152. After that, positive and negative drive signals are supplied to the electromagnet 160 by the driver 42 and a current is supplied to the coil of the electromagnet 160, thereby producing the reproducing magnetic field Hr set as a best value. The reproducing power instruction signal E15 from the reproducing laser power setting unit 92 in FIG. 7 is set as a target reading power to the target DAC register 120 provided for the laser diode control circuit in FIG. 5. A current Io is supplied to the laser diode 100 by the constant current source comprising the D/A converter 136 and APC 138, thereby irradiating the laser beam of the best value Pri of the reproducing laser power onto the optical storage medium and allowing the reproducing operation to be performed. As for the setting of the reproducing magnetic field and the reproducing laser power (reading power) upon reproduction by the reproducing magnetic field setting unit 90 and reproducing laser power setting unit 92, since the reproducing best value storing table 88 has been formed on a zone unit basis as shown in FIG. 8, the best values of the reproducing magnetic field and the reproducing laser power corresponding to the actual access track are obtained by the linear interpolation.

Figure 15:
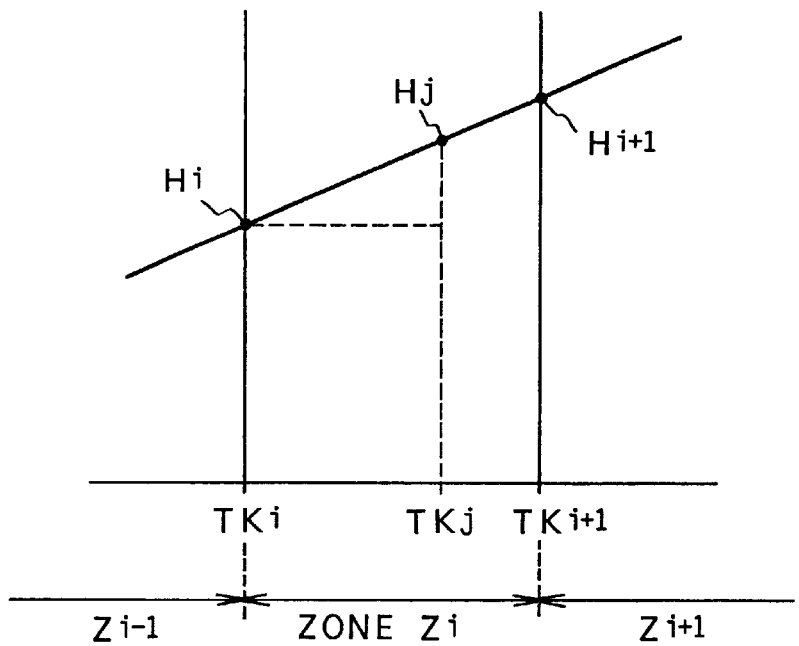
FIG. 15 is an explanatory diagram of a linear interpolation by a reproducing magnetic field setting unit in FIG. 7.

FIG. 15 shows a calculating process of the linear interpolation of the reproducing magnetic field corresponding to the access track in the reproducing magnetic field setting unit 90 in FIG. 7. It is now assumed that the track as an access target is TKj and belongs to the zone Zi. In this case, the best magnetic field Hi of the head track number TKi of the zone Zi and the best magnetic field Hi+1 of the head track number TKi+1 of the next zone Zi+1 have been stored in the reproducing best value storing table 88 in FIG. 7.

The best value Hj of the reproducing magnetic field of the track No. TKj belonging to the zone Zi can be calculated by the following equation of the linear interpolation.

$$Hj=Hi+\{(Hi1-Hi)/n\}\cdot\{(TKj-Tki)/n\}$$

This point shall also similarly apply to the reproducing power Pr stored in the reproducing best value storing table 88 in FIG. 8. The best value Pj of the reproducing laser power of the track No. TKj belonging to the zone Zi can be calculated by the following equation of the linear interpolation.

$$Pj=Pi+\{(Pi+1-Pi)/n\}\cdot\{(Tkj-Tki)/n\}$$

In FIG. 15, the head track number of each zone is set to a measuring track and the best values of the reproducing magnetic field and the reproducing laser power are determined and registered. However, the final track of each zone or the center track of the zone can be also used. Further, in the reproducing magnetic field setting unit 90 and reproducing laser power setting unit 92 in FIG. 7, a correcting process by the temperature T in the apparatus is executed to prevent that the best values are fluctuated due to the temperature T in the apparatus stored in the register group 94 upon reproduction.

Figure 16:
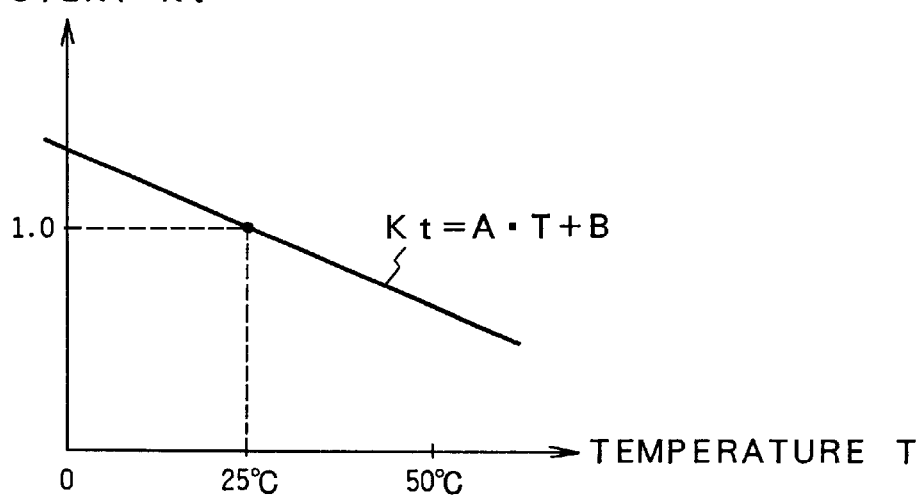
FIG. 16 is an explanatory diagram of temperature correction coefficients by the reproducing magnetic field setting unit in FIG. 7.

FIG. 16 shows characteristics of a temperature correction coefficient Kt to correct the best value of the reproducing magnetic field by the temperature T in the apparatus. The temperature correction coefficient Kt is given by $$Kt=AT+B$$

and generally has a negative temperature coefficient. The temperature correction coefficient Kt is set to Kt=1.0 when the temperature T in the apparatus is equal to T=25° C. The correction of the best value Hr of the reproducing magnetic field using the temperature correction coefficient Kt which is given by the characteristics of FIG. 15 can be calculated by $$Hr=Hr\{1-Kt\times(T-25°\text{ C.})\}$$

Similarly, with respect to the best value of the reproducing laser power as well, the correction of the best value Pr of the reproducing laser power is calculated by $$Pr=Pr\{1-Kt\times(T-25°\text{ C.})\}$$

by using the peculiar temperature correction coefficient Kt.

Figure 17A:
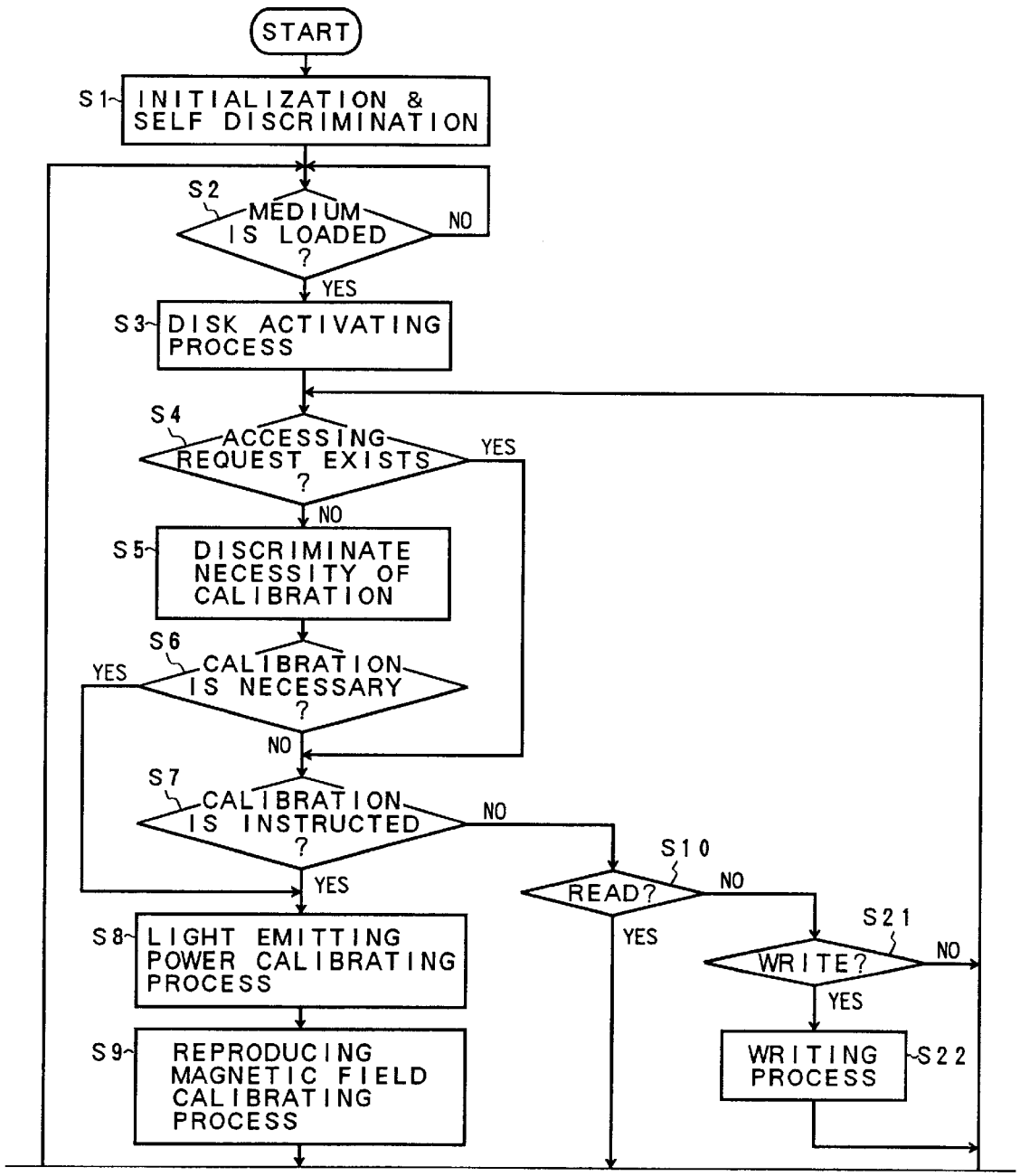
Figure 18:
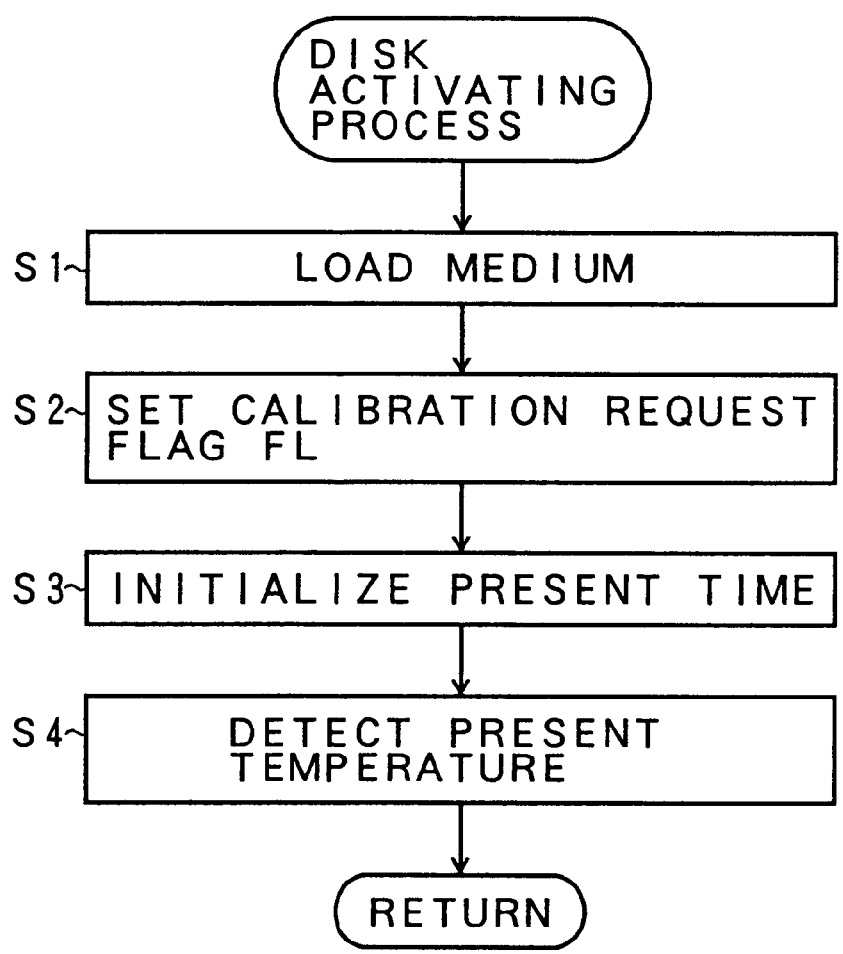
FIG. 18 is a flowchart for a disk activating process prior to the calibrating process of FIGS. 17A and 17B.

Processes of an optical storage apparatus of the invention having the calibration processing function of FIG. 7 will now be described. FIGS. 17A and 17B are flowcharts for the whole process of the optical storage apparatus of the invention. When an apparatus power source is turned on, an initialization and a self diagnosing process are executed in step S1. The apparatus waits for the insertion of a medium in step S2. When the medium is inserted in this state, step S3 follows and a disk activating process is executed. The disk activating process in step S3 is as shown in a flowchart of FIG. 18. In FIG. 18, first in step S1, the medium is loaded and is set to the spindle motor as shown in FIG. 4 and is rotated at a constant velocity. In step S2, a calibration request flag FL is set. In step S3, the present time is initialized. In step S4, the present temperature T in the apparatus is detected. Necessary processes to decide the light emitting power of the laser diode and the reproducing magnetic field by a magnetic field applying unit upon activation are finished.

Referring again to FIGS. 17A and 17B, when the disk activating process in step S3 is finished, step S4 follows and the presence or absence of an accessing request from the upper apparatus is discriminated. In the embodiment, even if the disk activating process is performed by the loading of the medium, the calibrating processes of the light emitting power and the reproducing magnetic field are not performed at this time point. The first calibrating process of the light emitting power and the reproducing magnetic field is executed by receiving a calibration instruction command which is issued for the first time from the upper apparatus which received a notification of the disk activating process. Therefore, the accessing request which is received from the upper apparatus for the first time in step S4 is the calibration instructing command. In step S7, a check is made to see if a calibrating instruction has been issued. In step S8, calibrating processes of the light emitting powers such as writing power, erasing power, reading power, and the like are executed. After that, in step S9, a reproducing magnetic field calibrating process is performed by the reproducing magnetic field calibrating unit in FIG. 7. On the other hand, when the calibrating instruction is not generated from the upper apparatus, the necessity of the calibration is discriminated in step S5. On the basis of a discrimination result, when the necessity of the calibration is decided in step S6, the light emitting power calibrating process in step S8 and the reproducing magnetic field calibrating process in step S9 are executed. When a read accessing request is received from the upper apparatus, step S10 follows and a reading request is discriminated. When it is decided that there is the reading request, the reading process in step S11 and subsequent steps are executed. In the reading process, a check is first made in step S11 to see if the calibrating process is being executed. When the calibrating process is being executed, the calibrating process is once interrupted in step S12. The reading process is performed in step S13. When the reading process is finished, the presence or absence of the read error is discriminated in step S14. If there is a read error, a reproducing magnetic field calibrating process is executed in step S15. After that, a retrying process is performed in step S16. When there is no read error, step S17 follows and a check is made to see if the calibrating process has been interrupted. If the calibrating process has been interrupted, the calibrating process is restarted from the interrupted time point in step S18. When the series of reading processes is finished as mentioned above, a check is made in step S19 to see if the medium has been ejected. If the medium is not ejected yet, the presence or absence of an apparatus stopping instruction is discriminated in step S20. After that, the processing routine is returned to step S2. The apparatus waits for the loading of the next medium and similar processes are repeated. When there is a request of write access from the upper apparatus, step S21 follows and the presence or absence of a writing request is discriminated. In step S22, a writing process is performed.

Figure 19A:
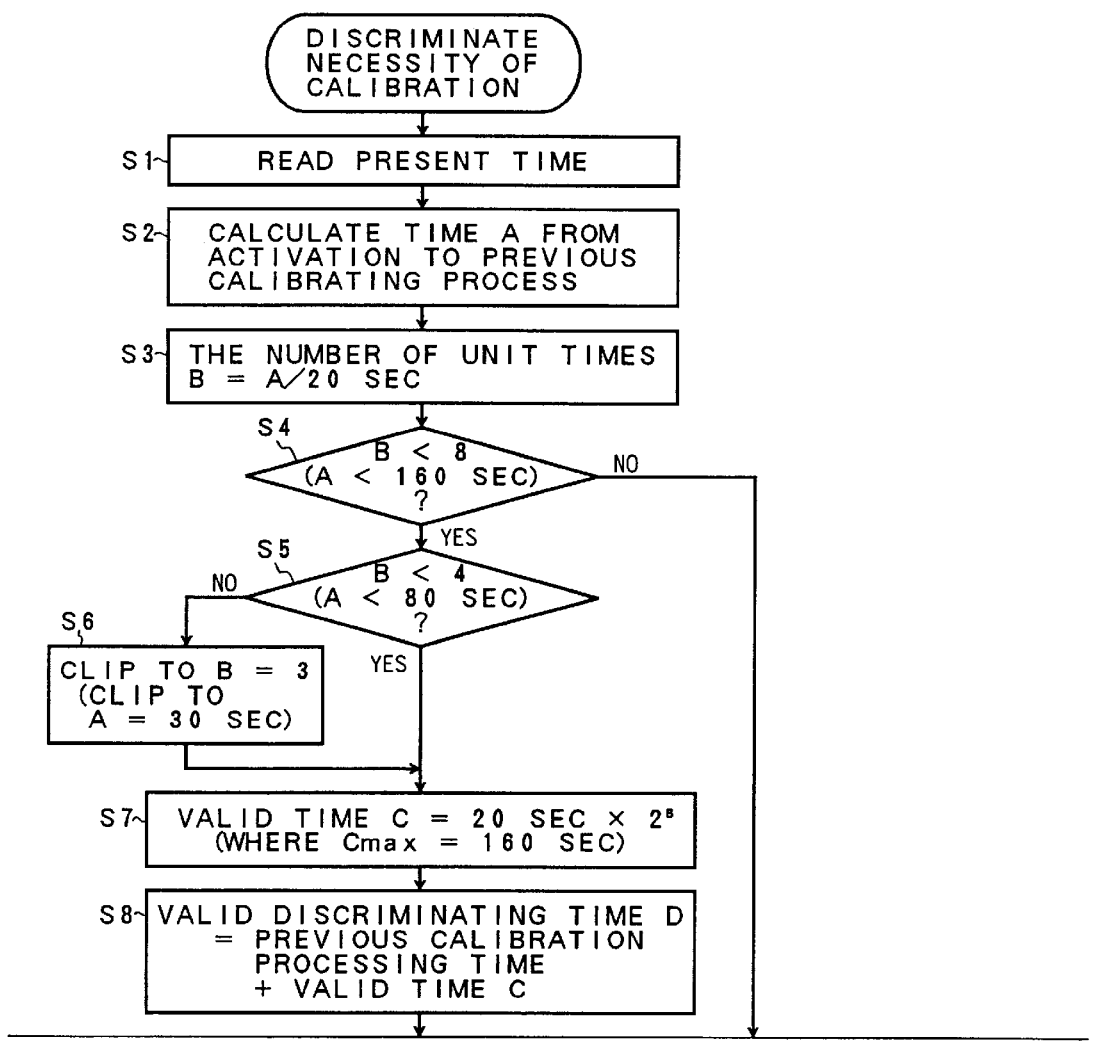
FIGS. 19A and 19B are flowcharts for discriminating the necessity of the calibrating process of FIGS. 17A and 17B.
Figure 19B:
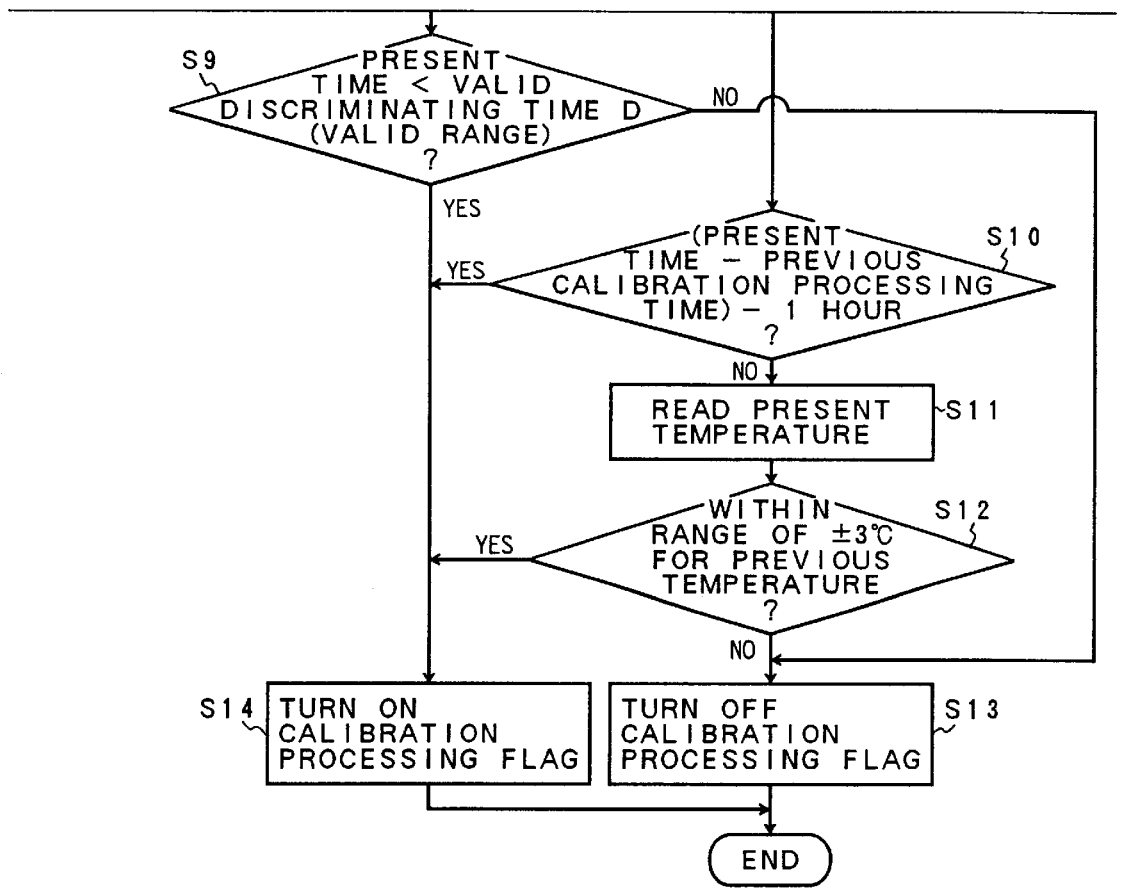

FIGS. 19A and 19B are flowcharts for a necessity discriminating process of the calibration in step S5 in FIGS. 17A and 17B. In the necessity discriminating process of the calibration, first in step S1, the present time is read. In step S2, a time A from the activation of the optical disk drive to the previous calibrating process is calculated. In step S3, by dividing the time A from the activation by a predetermined time (for example, 20 seconds), it is converted into the number B of unit times. In step S4, a check is made to see if the number B of unit times is less than 8, in other words, whether the time A from the activation to the first test writing is less than 160 seconds or not. If it is less than 160 seconds, step S5 follows. A check is made to see if the number B of unit times is less than 4, namely, whether the time A is less than 80 seconds or not. When the time A lies within a range from 80 seconds to 160 seconds, in step S6, the number B of unit times is set to 3, namely, the time A is clipped to 30 seconds. Step S7 follows. If the time A is less than 80 seconds in step S5, the processing routine advances to step S7. In step S7, a valid time C to guarantee the use of the best values (light emitting power and reproducing magnetic field) determined in the previous calibrating process is calculated. In this case, the valid time C is set to 20 seconds$\times 2^B$ (the number of unit times). However, the maximum value of the valid time is limited to 160 seconds. Thus, the valid time C to guarantee the best values determined by the calibrating process is set to the time corresponding to $2_B$ so long as the time A from the activation to the first calibrating process is less than 160 seconds. When the time A exceeds 160 seconds, it is fixed to the predetermined valid time C=160 seconds. The calculation of such a valid time C is varied in accordance with the time that is required until the medium temperature of the medium loaded in the optical disk drive is settled to the temperature in the apparatus. That is, at the initial stage just after the medium was loaded, since there is a difference between the temperature of the medium and the temperature in the apparatus, the calibration based on the temperature in the apparatus cannot be effectively performed at this state. Therefore, the calibrating process is not executed upon activation. When the time of about 1 to 2 minutes elapses, the temperature of the loaded medium is balanced to the temperature in the apparatus. Therefore, the first calibrating process is executed synchronously with the timing when the write command is issued from the upper apparatus for the first time after the optical disk drive was activated. Since there are various timings of issuing the write command from the upper apparatus after the activation, in steps S1 to S7 in FIGS. 19A to 19B, the time A from the activation to the first light emission adjustment is obtained. The valid time C to discriminate the calibration timing C after the next and subsequent times is determined on the basis of the time A. When the valid time C can be calculated in step S7, a valid discriminating time D is calculated in step S8 as a time obtained by adding the calculated valid time C to the previous test writing time. In step S9, a check is made to see if the present time has exceeded the valid discriminating time D. When the present time exceeds the valid discriminating time D, step S14 follows and the calibration processing flag is turned on. The processing routine is returned to step S6 in FIGS. 17A and 17B. In step S9, when the present time does not reach the valid discriminating time D, the calibration processing flag is turned off in step S17. When the number B of unit times is equal to or larger than 8, namely, when the time T is equal to or longer than 160 seconds in step S4, step S10 follows. A check is made to see if the time obtained by subtracting the previous calibration processing time from the present time is less than one hour. If it is less than one hour, the present temperature is read in step S11. In step S12, a check is made to see if the present temperature lies within a range of ±3° C. for the previous temperature. If it lies within ±3° C. the calibration processing flag is turned off in step S13 and the calibrating process is not performed. When there is a temperature fluctuation over the range of ±3° C. for the previous temperature, the calibration processing flag is turned on in step S14 and the calibrating process is executed. When the difference between the present time and the previous calibration processing time is equal to or longer than one hour in step S10, the calibration processing flag is forcedly turned on in step S14 and the calibrating process is executed. Each threshold time set in the necessity discriminating process of the calibrating process can be properly determined as necessary.

Figure 20:
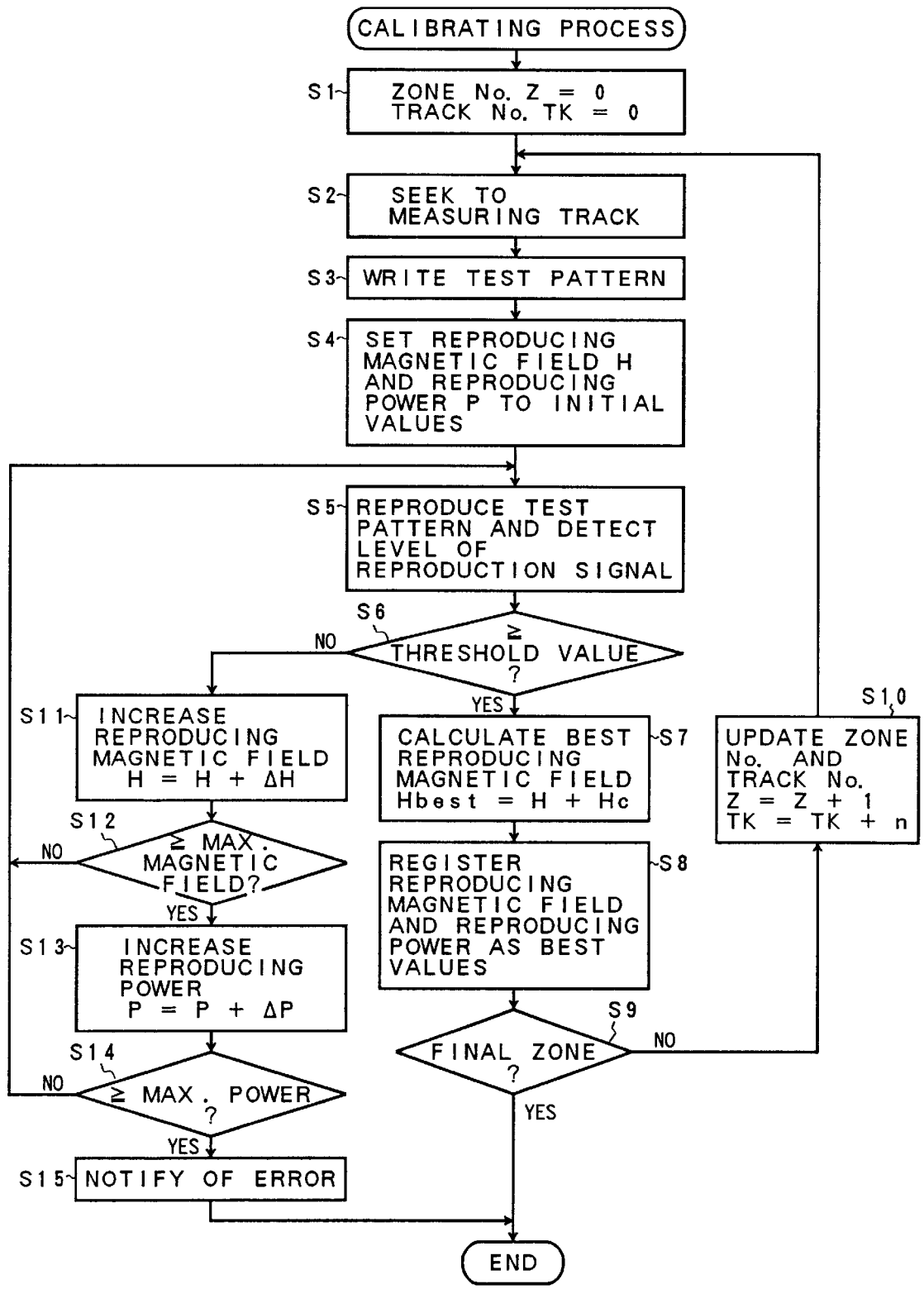
FIG. 20 is a flowchart for the reproduction calibrating process of FIGS. 17A and 17B to measure a reproduction signal.

FIG. 20 is a flowchart for the calibrating process of the reproducing magnetic field and the reproducing laser power which is executed in steps S9 and S10 in FIGS. 17A and 17B. First in step S1, after initializing to the zone No. Z=0 and the track No. TK=0, the optical head is sought to the measuring track in step S2. In step S3, each of the erasing and writing powers is set and a predetermined test pattern is written into the test track for measurement. In step S4, the reproducing magnetic field Hr and reproducing laser power Pr are set to initial values, for example, the minimum values. In step S5, the test pattern is reproduced and a reproduction signal is measured. The measurement of the reproduction signal is, for example, the measurement of the CNR value based on the peak detection of the reproduction RF signal as shown in FIG. 9. In step S6, a check is made to see whether the signal level is equal to or larger than the predetermined threshold value TH or not. If it is equal to or larger than the threshold value TH, in step S7, the best value Hbest of the reproducing magnetic field is calculated by, for instance, the calculating method as shown in FIG. 11. In step S8, a set of the calculated best value Hbest of the reproducing magnetic field and the reproducing laser power Pr at this time is registered as best values into the reproducing best value storing table 88. In step S9, a check is made to see if the target zone is the final zone. If it is not the final zone, the zone No. Z and track No. TK are updated in step S10. The processing routine is returned to step S2 and the calibrating process of the next zone is executed. On the other hand, as a measurement result of the reproduction signal in step S5, if the signal level is less than the threshold value in step S6, step S11 follows and the reproducing magnetic field Hr is increased by only the predetermined value ΔHr. When the reproducing magnetic field is less than the maximum magnetic field Hmax in step S12, the processing routine is returned to step S5. The test pattern is reproduced and the reproduction signal is measured. Such an increase in reproducing magnetic field is repeated until the reproducing magnetic field is equal to or larger than the maximum magnetic field Hmax in step S12. When the measurement result of the reproduction signal is not equal to or larger than the threshold value even if the reproducing magnetic field is increased to the maximum magnetic field Hmax, step S13 follows. The reproducing laser power Pr is increased by the predetermined value ΔPr. Under a condition that the reproducing laser power is less than the maximum power Pmax in step S14, the processing routine is returned to step S5. The reproducing magnetic field Hr is again set to the minimum value as an initial value. After that, the reproduction signal is measured by reproducing the test pattern in step S5. Such a process for increasing the reproducing magnetic field step by step within the range between the minimum value and the maximum value while increasing the reproducing laser power is repeated. In step S14, even if the reproducing laser power Pr is equal to or larger than the maximum power, if the measurement value of the reproduction signal is not equal to or larger than the threshold value, this means that the reproduction is impossible. Therefore, an error such as a medium abnormality or the like is notified in step S15. The processing routine is finished. In FIG. 20, like step S7, the best value Hbest is obtained by adding the predetermined value Hc to the reproducing magnetic field Hr when the reproduction signal is equal to or larger than the threshold value for the first time while increasing the reproducing magnetic field step by step. However, as shown in FIG. 10, it will be obviously understood that on the basis of the magnetic fields Hs and He at the measuring point 166 of the leading edge and the measuring point 168 of the trailing edge of the measuring characteristics 162 of the reproduction signal, the best value Hbest of the reproducing magnetic field is obtained as a median between them.

Figure 21:
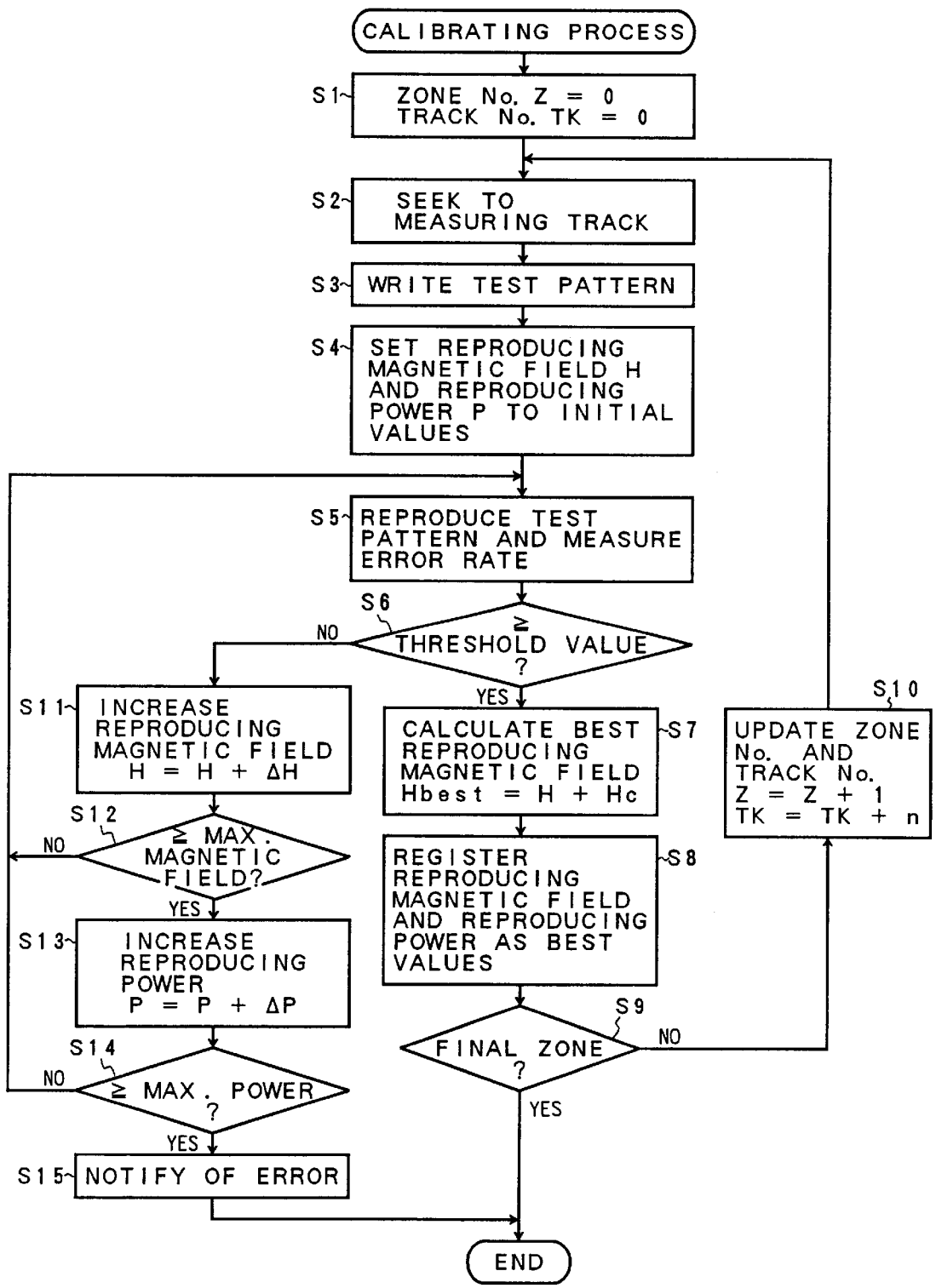
FIG. 21 is a flowchart for the reproduction calibrating process of FIGS. 17A and 17B to measure an error rate.

FIG. 21 shows another embodiment of the calibrating process of FIG. 7. There is executed the calculating process in FIG. 13 such that an error rate is measured from the reproduction signal of the test pattern as shown in step S5, when the error rate is equal to or less than the threshold value, the reproducible state is determined in step S6, and the value obtained by adding the predetermined value Hc to the reproducing magnetic field Hr at that time is set to the best value Hbest in step S7. The other processes are the same as those in the discrimination of the reproducible state by the measurement of the reproduction signal in FIG. 20. As for the calculation of the best value Hbest of the reproducing magnetic field in step S7 in FIG. 21, it will be obviously understood that it can be also calculated as a median of the magnetic fields Hs and He at the measuring point 174 of the trailing edge when the number N of times of bit dissidence serving as an error rate is equal to or less than the threshold value Nth and the measuring point 176 of the subsequent leading edge as shown in FIG. 13.

Figure 22:
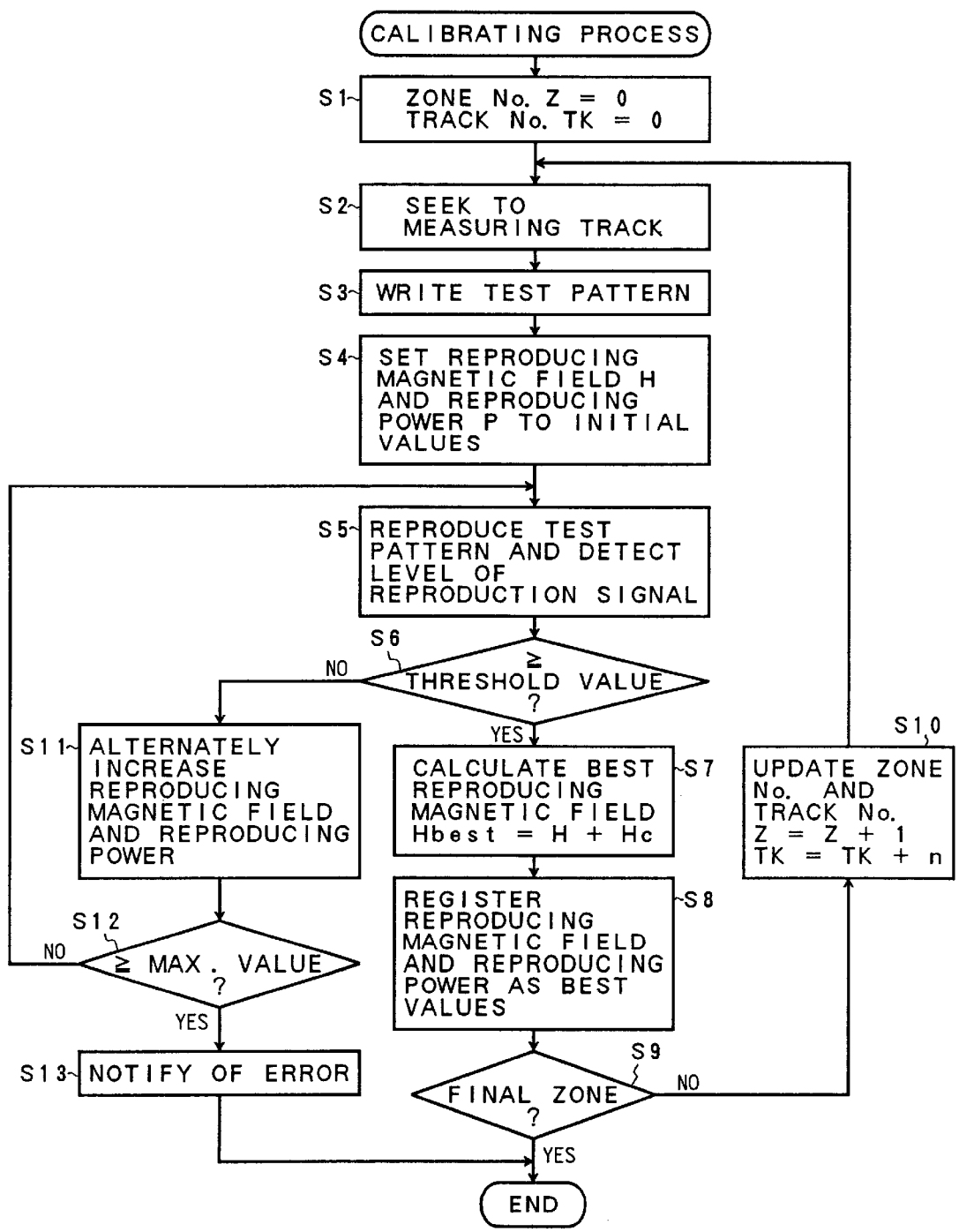
FIG. 22 is a flowchart for the calibrating process of FIGS. 17A and 17B to measure the reproduction signal while alternately increasing the reproducing magnetic field and reproducing laser power.

FIG. 22 is a flowchart for the processing mode 2 to decide the best value while alternately increasing the reproducing magnetic field and the reproducing laser power step by step with respect to the calibrating process to calculate the best values of the reproducing magnetic field and the reproducing laser power from the measurement value of the reproduction signal of the test pattern in a manner similar to FIG. 20. Even in the flowchart of the processing mode 2, steps S1 to S10 are substantially the same as those in FIG. 20. However, when the level of the reproduction signal is less than the threshold value in step S6, step S11 follows. While alternately increasing the reproducing magnetic field and the reproducing laser power until both of them reach the maximum values in step S12, the comparing process for comparing the detection level of the reproduction signal with the threshold value in steps S5 and S6 is repeated. By repeating the measurement of the reproduction signal while alternately increasing the reproducing magnetic field and the reproducing laser power in the case where the reproduction signal is less than the threshold value as mentioned above, the increase in reproducing magnetic field and the reproducing laser power for the best values is rapidly executed and the calibrating process to obtain the best value can be finished in a short time as compared with the case of discriminating that the measurement value of the reproduction signal is equal to or larger than the threshold value while increasing the reproducing magnetic field Hr step by step in a state where the reproducing laser power Pr is fixed as shown in FIG. 20. In FIG. 22, the level of the reproduction signal is detected in step S5 and whether it is equal to or larger than the threshold value or not is discriminated in step S6. However, with respect to the case where the error rate is measured and when it is equal to or less than the threshold value, the best value of the reproducing magnetic field is calculated as shown in steps S5 and S6 in FIG. 21 as well, the invention can be also similarly applied to such a case by replacing the processes in steps S11 to S14 in FIG. 21 by steps S11 to S13 in FIG. 22.

According to the invention as mentioned above, with respect to the reproduction which needs the reproducing magnetic field of the optical storage medium having the recording layer to record data onto the board and the reproducing layer to reproduce the data recorded in the recording layer, the reproducing process is executed while changing the reproducing magnetic field and the reproducing laser power, and the best reproducing magnetic field and reproducing laser power are obtained. Therefore, a situation such that since the reproducing magnetic field or reproducing laser power is too strong, the mask portion is widened, so that the recording data cannot be read out or the recording data is erased can be certainly prevented. The current which is supplied to the applying unit such as an electromagnet or the like to apply the reproducing magnetic field can be also suppressed to the minimum current necessary to apply the best reproducing magnetic field, so that an electric power consumption of the apparatus can be also reduced. Further, a situation such that since the reproducing magnetic field and the reproducing laser power are too weak, the mask portion is narrowed, so that an error occurs by a crosstalk with the neighboring pit can be also certainly prevented.

Figure 2B:
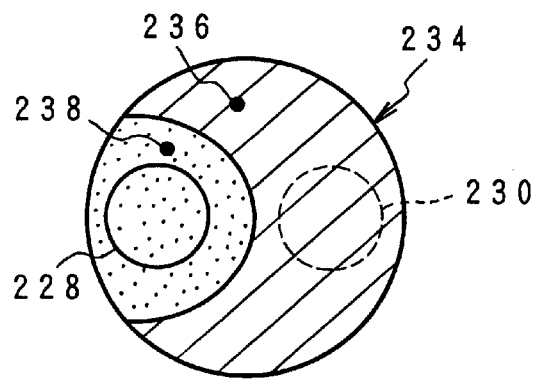

The calibrating process of the above embodiment has been performed with regard to the reproducing magnetic field Hr and reproducing laser power Pr of the FAD medium in FIGS. 1A and 1B as an example. However, in the RAD medium of FIGS. 2A and 2B, by replacing the initializing magnet 232 by the magnetic field applying unit 44 in FIGS. 1A and 1B, the calibrating process of the invention to optimize the initializing magnetic field Hi together with the reproducing laser power Pr can be applied as it is.

The medium to which the magnetically induced super resolution (MSR) is applied is a medium which fundamentally has the recording layer and the reproducing layer. However, there are other various media having proper auxiliary layers. In any one of those media, since a reproducing magnetic field from the outside is necessary upon reproduction, the reproducing magnetic field and the reproducing laser power can be optimized by the calibrating process of the invention, respectively.

The present invention incorporates many modifications within a range without losing the objects and advantages of the invention. Further, the invention is not limited by the numerical values shown in the embodiment.

What is claimed is:

1. An optical storage apparatus comprising:
  a recording unit for recording data to a recording layer of an optical storage medium having at least a recording layer to record data and a reproducing layer to reproduce the data recorded in said recording layer on a board at a recording density smaller than a beam diameter of a laser beam;
  a reproducing unit for reproducing the data recorded in the recording layer of said optical storage medium at a recording density smaller than said beam diameter by setting a combination of a reproducing magnetic field and a reproducing laser power which are necessary for reproduction to best values; and
  a calibration processing unit for measuring a reproducible state by performing the reproducing operation of said optical storage medium by said reproducing unit while changing said reproducing magnetic field and said reproducing laser power, thereby determining a set of the best values of the reproducing magnetic field and the reproducing laser power which are used in said reproducing unit on the basis of the reproducing magnetic field or the reproducing laser power at the time when said reproducible state is obtained,
  wherein said calibration processing unit determines the best values of said reproducing magnetic field and said reproducing laser power every predetermined zone of said optical storage medium and stores and holds said best values into a memory.

2. An apparatus according to claim 1, wherein in a state where the reproducing laser power is set to a predetermined initial value, said calibration processing unit measures the reproducible state while increasing the reproducing magnetic field by setting a predetermined minimum reproducing magnetic field to an initial value and determines the best value on the basis of the reproducing magnetic field when said reproducible state is obtained.

3. An apparatus according to claim 2, wherein said calibration processing unit sets a median of a reproducing magnetic field range in the reproducible state to the best value.

4. An apparatus according to claim 2, wherein said calibration processing unit sets a value obtained by adding a predetermined value to the reproducing magnetic field when the reproducible state was first obtained to the best value.

5. An apparatus according to claim 2, wherein said calibration processing unit sets a value obtained by multiplying the reproducing magnetic field in which the reproducible state was first obtained by a predetermined coefficient exceeding "1" to the best value.

6. An apparatus according to claim 2, wherein when said reproducible state cannot be obtained even if said reproducing magnetic field is increased, said calibration processing unit repeats the measurement of said reproducible state while increasing said reproducing laser power step by step.

7. An apparatus according to claim 1, wherein said calibration processing unit sets predetermined minimum reproducing magnetic field and minimum reproducing laser power to initial values, measures the reproducible state while alternately increasing the reproducing magnetic field and the reproducing laser power, and determines the best values on the basis of the reproducing magnetic field and the reproducing laser power when the reproducible state is obtained.

8. An apparatus according to claim 7, wherein said calibration processing unit sets values obtained by adding a predetermined value to each of the reproducing magnetic field and the reproducing laser power when the reproducible state is first obtained to the best values of the reproducing magnetic field and the reproducing laser power.

9. An apparatus according to claim 7, wherein said calibration processing unit sets values obtained by multiplying each of the reproducing magnetic field and the reproducing laser power when the reproducible state is first obtained by a predetermined coefficient exceeding "1" to the best values of the reproducing magnetic field and the reproducing laser power.

10. An apparatus according to claim 1, wherein said calibration processing unit measures the reproducible state by increasing said reproducing magnetic field step by step on a predetermined value unit basis.

11. An apparatus according to claim 1, wherein said calibration processing unit increases said reproducing magnetic field step by step at a resolution of at least 50 oersteds or less and measures the reproducible state.

12. An apparatus according to claim 1, wherein said calibration processing unit sets the minimum value of said reproducing magnetic field to a range of 50 to 100 oersteds.

13. An apparatus according to claim 12, wherein said calibration processing unit limits the maximum value of said reproducing magnetic field to a range of 400 to 500 oersteds.

14. An apparatus according to claim 1, wherein said calibration processing unit increases said reproducing laser power step by step at a resolution of at least 0.5 mW or less and measures the reproducible state.

15. An apparatus according to claim 2, wherein said calibration processing unit sets the minimum value of said reproducing laser power to a range of 3.0 to 5.0 mW.

16. An apparatus according to claim 12, wherein said calibration processing unit limits said reproducing laser power to a range which does not exceed a maximum light emitting power of a laser diode.

17. An apparatus according to claim 1, wherein when a reproduction signal from said reproducing unit is equal to or larger than a predetermined threshold value, said calibration processing unit determines the reproducible state and decides the best values of said reproducing magnetic field and said reproducing laser power.

18. An apparatus according to claim 17, wherein in the case where a peak detection signal of an RF signal reproduced from medium return light by said reproducing unit is equal to or larger than a predetermined threshold value, said calibration processing unit determines the reproducible state and decides the best values of said reproducing magnetic field and said reproducing laser power.

19. An apparatus according to claim 1, wherein said calibration processing unit measures an error rate of a reproduction signal from said reproducing unit, when said error rate is equal to or less than a predetermined threshold value, said calibration processing unit determines the reproducible state and decides the best values of said reproducing magnetic field and said reproducing laser power.

20. An apparatus according to claim 19, wherein said calibration processing unit measures the number of bit errors as said error rate by comparing reproduction data by said reproducing unit with recording data at a reproducing position which has previously been known on a bit unit basis, and when said number of bit errors is equal to or less than a predetermined threshold value, said calibration processing unit decides the reproducible state.

21. An apparatus according to claim 1, wherein when an interrupting request is generated from an upper apparatus during the calibration of said reproducing magnetic field and said reproducing laser power, said calibration processing unit temporarily interrupts the calibration and restarts the process from an interrupted position after completion of an interrupting process.

22. An apparatus according to claim 1, wherein said reproducing unit reads out the best values of the reproducing magnetic field and the reproducing laser power of a zone corresponding to a reproducing position of said optical storage medium from said memory and uses said best values.

23. An apparatus according to claim 1, wherein said reproducing unit obtains the best values of the reproducing magnetic field and the reproducing laser power corresponding to a reproducing position of said optical storage medium by a linear approximation of the zone read out from said memory and uses said best values.

24. An apparatus according to claim 1, wherein said reproducing unit corrects the best values of the reproducing magnetic field and the reproducing laser power determined by said calibration processing unit on the basis of a temperature in the apparatus upon reproduction and uses the corrected best values.

25. An apparatus according to claim 1, wherein said reproducing unit generates the best values of the reproducing magnetic field and the reproducing laser power determined by said calibration processing unit for only a reproducing period of time in a sector of said optical storage medium while a reproduction gate signal is ON.

26. An apparatus according to claim 1, wherein at the time of an initialization diagnosing process in association with a turn-on of a power source of the apparatus, said calibration processing unit calibrates said reproducing magnetic field and said reproducing laser power.

27. An apparatus according to claim 1, wherein when said optical storage medium is loaded into the apparatus, said calibration processing unit calibrates said reproducing magnetic field and said reproducing laser power.

28. An apparatus according to claim 1, wherein a temperature in the apparatus is monitored, and when a change in said temperature is equal to or larger than a predetermined value, said calibration processing unit calibrates said reproducing magnetic field and said reproducing laser power.

29. An apparatus according to claim 1, wherein said calibration processing unit monitors an elapsed time from the previous calibration during the operation of the apparatus and calibrates said reproducing magnetic field and said reproducing laser power when a predetermined calibration valid time elapses.

30. An apparatus according to claim 1, wherein when an error occurs in said reproducing unit and a retrying process is executed, said calibration processing unit calibrates said reproducing magnetic field and said reproducing laser power.

31. An apparatus according to claim 1, wherein said calibration processing unit calibrates said reproducing magnetic field and said reproducing laser power at the time of start-up of the apparatus in a factory.

32. A reproducing method of an optical storage medium, comprising:
a reproducing step of reproducing data recorded in a recording layer of an optical storage medium having at least the recording layer to record data and a reproducing layer to reproduce the data recorded in said recording layer on a board at a recording density smaller than a beam diameter of a laser beam by setting a combination of reproducing magnetic field and a reproducing laser power which are necessary for reproduction to best values; and a calibrating step of measuring a reproducible state by performing the reproducing operation of said optical storage medium while changing said reproducing magnetic field and said reproducing laser power, thereby determining a set of the best values of said reproducing magnetic field and said reproducing laser power on the basis of the reproducing magnetic field and the reproducing laser power at the time when said reproducible state is obtained, wherein said calibrating step determines the best values of said reproducing magnetic field and said reproducing laser power every predetermined zone of said optical storage medium and stores and holds said best values into a memory.

33. A method according to claim 32, wherein in said calibrating step, in a state where the reproducing laser power is set to a predetermined initial value, the reproducible state is measured while increasing the reproducing magnetic field by setting a predetermined minimum reproducing magnetic field to an initial value and the best value is determined on the basis of the reproducing magnetic field when said reproducible state is obtained.

34. A method according to claim 32, wherein in said calibrating step, predetermined minimum reproducing magnetic field and minimum reproducing laser power are set to initial values, the reproducible state is measured while alternately increasing the reproducing magnetic field and the reproducing laser power, and the best values are determined on the basis of the reproducing magnetic field and the reproducing laser power when said reproducible state is obtained.

35. A reproducing apparatus for reproducing data recorded in a recording layer of an optical storage medium having at least the recording layer to record data and a reproducing layer to reproduce the data recorded in said recording layer on a board at a recording density smaller than a beam diameter of a laser beam;

a reproducing unit for reproducing the data recorded in the recording layer of said optical storage medium at a recording density smaller than said beam diameter by setting a combination of reproducing magnetic field and a reproducing laser power which are necessary for reproduction to best values; and a calibration processing unit for measuring a reproducible state by performing the reproducing operation of said optical storage medium by said reproducing unit while changing said reproducing magnetic field and said reproducing laser power, thereby determining a set of the best values of the reproducing magnetic field and the reproducing laser power which are used in said reproducing unit on the basis of the reproducing magnetic field or the reproducing laser power at the time when said reproducible state is obtained, wherein said calibration processing unit determines the best values of said reproducing magnetic field and said reproducing laser power every predetermined zone of said optical storage medium and stores and holds said best values into a memory.

* * * * *